(12) United States Patent
Kang et al.

(10) Patent No.: US 10,587,776 B2
(45) Date of Patent: Mar. 10, 2020

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Seong-min Kang, Seoul (KR); Heung-woo Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/043,930

(22) Filed: Jul. 24, 2018

(65) Prior Publication Data

US 2019/0028608 A1 Jan. 24, 2019

Related U.S. Application Data

(60) Provisional application No. 62/536,042, filed on Jul. 24, 2017.

(30) Foreign Application Priority Data

Oct. 30, 2017 (KR) .................. 10-2017-0142106

(51) Int. Cl.
*H04N 1/44* (2006.01)
*H04N 19/126* (2014.01)

(52) U.S. Cl.
CPC .......... *H04N 1/444* (2013.01); *H04N 1/4413* (2013.01); *H04N 19/126* (2014.11)

(58) Field of Classification Search
CPC ..... H04N 1/444; H04N 1/4413; H04N 19/126
See application file for complete search history.

(56) References Cited

U.S. PATENT DOCUMENTS

2009/0060324 A1 3/2009 Ballerini
2009/0285390 A1 11/2009 Scherer et al.
(Continued)

FOREIGN PATENT DOCUMENTS

JP 2006-54744 A 2/2006
JP 2006-72754 A 3/2006
(Continued)

OTHER PUBLICATIONS

Written Opinion (PCT/ISA/237) dated Oct. 25, 2018 issued by the International Searching Authority in International Application No. PCT/KR2018/008355.
(Continued)

*Primary Examiner* — Neil R McLean
(74) *Attorney, Agent, or Firm* — Sughrue Mion, PLLC

(57) ABSTRACT

A method for controlling an electronic device including at least one processor configured to encrypt an image and upload the encrypted image to an external server by using an artificial intelligence neural network model is provided. The method includes receiving a command to upload an image to the external server; acquiring, based on the command, a characteristic value corresponding to the image by inputting the image and a key of the electronic device into a neural network model trained to identify characteristic values based on an input image and an input key; and transmitting identification information of the image and the characteristic value to the external server.

19 Claims, 22 Drawing Sheets

(56) References Cited

U.S. PATENT DOCUMENTS

| | | | |
|---|---|---|---|
| 2010/0316222 A1* | 12/2010 | Inami | G06T 1/0021 380/277 |
| 2010/0322464 A1 | 12/2010 | Beak | |
| 2011/0173444 A1 | 7/2011 | Sato et al. | |
| 2012/0045093 A1* | 2/2012 | Salminen | G06K 9/00295 382/103 |
| 2015/0248765 A1 | 9/2015 | Criminisi et al. | |
| 2016/0078217 A1* | 3/2016 | Das | G06F 21/45 726/18 |
| 2016/0110906 A1* | 4/2016 | Ahuja | G06T 11/60 345/634 |
| 2016/0140146 A1* | 5/2016 | Wexler | G06K 9/18 707/741 |
| 2016/0171346 A1 | 6/2016 | Han et al. | |
| 2016/0247044 A1 | 8/2016 | Shen et al. | |
| 2016/0292589 A1 | 10/2016 | Taylor, Jr. et al. | |
| 2017/0097948 A1 | 4/2017 | Kerr et al. | |

FOREIGN PATENT DOCUMENTS

| | | |
|---|---|---|
| JP | 2010-176370 A | 8/2010 |
| KR | 10-2008-0075090 A | 8/2008 |
| KR | 10-0880243 B1 | 1/2009 |

OTHER PUBLICATIONS

International Search Report (PCT/ISA/210) dated Oct. 25, 2018 issued by the International Searching Authority in International Application No. PCT/KR2018/008355.
GitHub, "iGAN: Interactive Image Generation via Generative Adversarial Networks", https://github.com/junyanz/iGAN, retrieved Jun. 4, 2018. (6 pages total).
James Vincent, "Google's AI has learned how to draw by looking at your doodles", The Verge, Apr. 13, 2017, https://www.theverge.com/2017/4/13/15284448/google-ai-draw-doodles-sketch-rnn. (4 pages total).

* cited by examiner

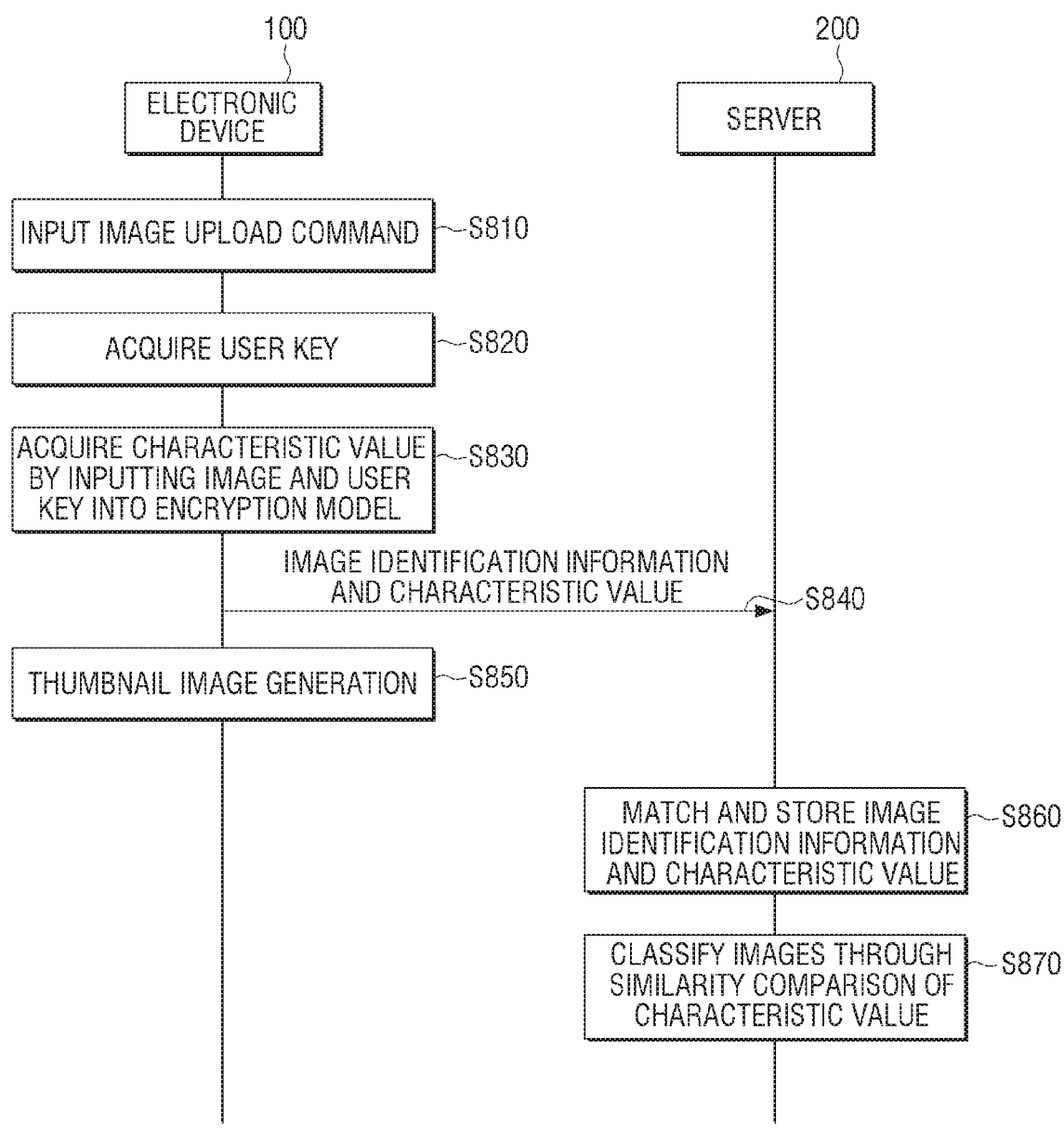

(a)  (b)

(a)            (b)

(a) (b)

(c)

ELECTRONIC DEVICE AND METHOD FOR CONTROLLING THE ELECTRONIC DEVICE

CROSS-REFERENCE TO RELATED APPLICATIONS

This application is based on and claims the benefit of U.S. Provisional Application No. 62/536,042 filed on Jul. 24, 2017, in the United States Patent and Trademark Office, and priority under 35 U.S.C. § 119 to Korean Patent Application No. 10-2017-0142106, filed on Oct. 30, 2017, in the Korean Intellectual Property Office, the disclosures of which are incorporated by reference herein in their entireties.

BACKGROUND

1. Field

The disclosure relates to an electronic device and a controlling method thereof, and more particularly, to an electronic device for encrypting an image by using a user key and uploading the encrypted image to an external server, and a controlling method thereof.

The disclosure also relates to an artificial intelligence (AI) system that simulates functions, such as recognition and judgment, of a human brain using a machine learning algorithm and its application.

2. Related Art

Recently, artificial intelligence systems that implement artificial intelligence have been used in various fields. An artificial intelligence system is a system where the machine learns, judges and becomes smart, unlike a conventional rule-based smart system. The more the artificial intelligence system is used, the higher the recognition rate and the better understanding of user preference.

Artificial intelligence technology consists of machine learning (e.g., deep learning) and element technologies that use machine learning.

Machine learning is an algorithm technology that classifies/trains the characteristics of input data by itself. Element technology is a technology that simulates functions, such as recognition and judgment of the human brain, using a machine learning algorithm such as deep learning and includes linguistic understanding, visual understanding, reasoning/prediction, knowledge representation, motion control, etc.

Artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if it was perceived by human being, including object recognition, object tracking, image search, human recognition, scene understanding, spatial understanding, image enhancement, etc. Inference prediction is a technology for judging and logically inferring and predicting information, including knowledge/probability based reasoning, optimization prediction, preference base planning, and recommendation. Knowledge representation is a technology for automating human experience information into knowledge data, including knowledge building (data generation/classification) and knowledge management (data utilization). The motion control is a technology for controlling the autonomous travel of a vehicle and the motion of a robot, including motion control (navigation, collision and traveling), operation control (behavior control), and the like.

Recently, as communication technology has developed and the capacity of a high-quality image has increased, an image photographed by an electronic device can be stored not only in an electronic device but also in an external device such as a cloud server.

In this case, when an image is transmitted to an external device such as a cloud server, privacy can be violated due to hacking, and time and cost for transmitting a high-quality image itself to an external device may be increased.

Accordingly, a method is needed for uploading an image of small capacity while preventing leak of personal information in the process of uploading or downloading an image to or from an external device.

SUMMARY

Embodiments provide an electronic device capable of preventing leak of personal information, and uploading and downloading a compressed image by encrypting and compressing an image using a user key when uploading and downloading an image to and from an external server and a controlling method thereof.

In accordance with an aspect of the disclosure, there is provided a method for controlling an electronic device including at least one processor configured to encrypt an image and upload the encrypted image to an external server by using an artificial intelligence neural network model, the method including: receiving a command to upload an image to the external server; acquiring, based on the command, a characteristic value corresponding to the image by inputting the image and a key of the electronic device into a neural network model trained to identify characteristic values based on an input image and an input key; and transmitting identification information of the image and the characteristic value to the external server.

The key of the electronic device may be one from among a password of the electronic device and identification information of the electronic device.

The key may be one of a plurality of keys, and the transmitting may include transmitting version information of the key corresponding to the image to the external server together with the identification information of the image and the characteristic value.

The method may further include: acquiring, based on the command, a thumbnail image corresponding to the image; matching and storing the thumbnail image and the identification information of the image; and deleting the image.

The method may further include providing the thumbnail image based on receiving a display command to display the image.

The external server may match and store the identification information of the image and the characteristic value, compare a similarity between the image and another image based on the characteristic value, and classify the image based on the similarity.

The method may further include: receiving a retrieval command to retrieve an image related to a keyword; transmitting a request to the external server requesting a search related to the keyword; and receiving, based on the request, a characteristic value corresponding to at least one search image related to the keyword from the external server, the at least one search image being at least one from among images classified based on the similarity comparison.

The method may further include restoring the at least one search image by inputting the characteristic value corresponding to the at least one search image and the key of the electronic device into a decryption model trained to restore an image by using the characteristic value corresponding to the at least one search image and the key as input data.

The method may further include: transmitting, based on receiving a download command to receive the characteristic value corresponding to the image, a request signal requesting the characteristic value corresponding to the image to the external server; receiving, based on the request signal, the characteristic value corresponding to the image from the external server; and restoring the image by inputting the characteristic value corresponding to the image and the key of the electronic device into a decryption model which is trained to restore an image by using the characteristic value and the key.

The receiving may include receiving version information of the key of the electronic device used for encrypting the image together with the characteristic value corresponding to the image from the external server, and the restoring may include restoring the image by inputting the characteristic value corresponding to the image and the key of the electronic device corresponding to the version information into the decryption model.

In accordance with another aspect of the disclosure, there is provided an electronic device, including: a communicator; a display; a memory; and a processor configured to control the electronic device in electrical connection with the communicator, the display and the memory, wherein the processor is further configured to: implement a neural network model trained to acquire a characteristic value by using an image and a key as input data and a program for performing an operation of the electronic device, acquire an input signal according to a command to upload an image to an external server, acquire, based on the input signal, the characteristic value corresponding to the image by inputting the image and a key of the electronic device into the neural network model, and control the communicator to transmit identification information of the image and the characteristic value to the external server.

The key of the electronic device may be one from among a password of the electronic device and identification information of the electronic device.

The key may be one of a plurality of keys, and the processor may be further configured to control the communicator to transmit version information of the key corresponding to the image to the external server together with the identification information of the image and the characteristic value.

The processor may be further configured to: acquire, based on the command, a thumbnail image corresponding to the image, match and store the thumbnail image and the identification information of the image in the memory, and delete the image from the memory.

The processor may be further configured to control the display to provide the thumbnail image based on receiving a display command the display the image.

The identification information of the image may be matched with the characteristic value in the external server, and the external server may compare a similarity between the image and another image based on the characteristic value, and classify the image based on the similarity.

The processor may be further configured to: acquire an input signal according to a retrieval command to retrieve an image related to an input keyword, control the communicator to transmit a request signal to the external server requesting a search related to the keyword to the external server, and receive a characteristic value corresponding to at least one search image related to the keyword from the external server through the communicator, the at least one search image being at least one from among images classified based on the similarity comparison.

The processor may be further configured to implement a decryption model trained to restore an image by using a characteristic value and a key as input data, and restore the at least one search image by inputting a characteristic value corresponding to the at least one search image and the key of the electronic device into the decryption model.

The processor may be further configured to: implement a decryption model trained to restore an image by using a characteristic value and a key as input data, control the communicator to transmit, based on a download command to receive the characteristic value corresponding to the image being received, a request signal requesting the characteristic value corresponding to the image to the external server, receive the characteristic value corresponding to the image from the external server through the communicator, and restore the image by inputting the characteristic value corresponding to the image and the key of the electronic device into the decryption model.

Version information of the key of the electronic device used for encrypting the image may be received together with the characteristic value corresponding to the image from the external server, and the processor may be further configured to restore the image by inputting the characteristic value corresponding to the image and the key of the electronic device corresponding to the version information into the decryption model.

In accordance with yet another aspect of the disclosure, there is provided a non-transitory computer readable recording medium having embodied thereon a program, which when executed by a processor of an electronic device including at least one processor to encrypt an image and upload the encrypted image to an external server by using an artificial intelligence neural network model, causes the processor to execute a method for controlling the electronic device, the method including: receiving a command to upload an image to the external server; acquiring, based on the command, a characteristic value corresponding to the image by inputting the image and a key of the electronic device into a neural network model trained to identify characteristic values based on an input image and an input key; and transmitting identification information of the image and the characteristic value to the external server. In accordance with yet still another aspect of the disclosure, there is provided a device including: a communicator; and a processor configured to control the device to: implement a neural network model trained to acquire a characteristic value based on input data, the input data including an image and a key, acquire an upload command to upload an image to an external server, input the image and a key of the electronic device into the neural network model, acquire a characteristic value corresponding to the image and the key from the neural network model, and the image and the characteristic value to the external server.

BRIEF DESCRIPTION OF THE DRAWINGS

FIGS. 8A and 8B are views to explain a method for encrypting and uploading an image by using an encryption model according to an embodiment;

DETAILED DESCRIPTION

Figure 1:
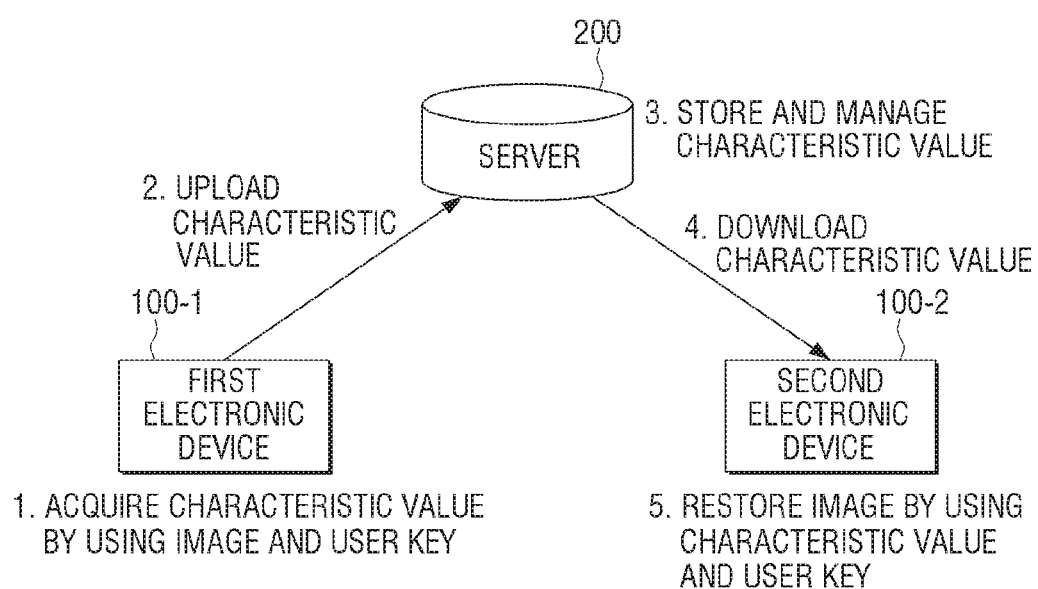
FIG. 1 is a view to explain a system for compressing and encrypting an image by using a user key and storing the image in an external server according to an embodiment.

The present disclosure is not limited to the embodiments disclosed below and may be implemented in various forms and the scope of the disclosure is not limited to the following embodiments. In addition, all changes or modifications derived from the meaning and scope of the claims and their equivalents should be construed as being included within the scope of the present disclosure. Like reference numerals refer to like elements throughout the description of drawings.

According to the present disclosure, the expressions "include," "comprise," "including," and "comprising," represent that one or more components, steps, operations, and elements exist or are added, and does not exclude the presence of additional features.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terms such as 'first' and 'second' may use corresponding components regardless of importance or order and are used to distinguish a component from another without limiting the components.

When an element (e.g., a first constituent element) is referred to as being "operatively (or communicatively) coupled with/to" or "connected to" another element (e.g., a second constituent element), it should be understood that the element is indirectly connected or coupled to the another element or connected or coupled to the another element with one or more intervening elements (e.g., a third constituent element) interposed therebetween. However, when an element (e.g., a first constituent element) is referred to as being "directly connected' or "directly coupled" to another constituent element (e.g., a second constituent element), it can be understood that there is not another constituent element (e.g., a third constituent element) between an element and another element.

An electronic device according to various embodiments may be one of a smart phone, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, or a wearable device. A wearable device may be one of the accessory type (e.g., a watch, a ring, a bracelet, a necklace, a pair of glasses, a contact lens or a head-mounted-device (HMD)), a fabric or a garment-integrated type (e.g., electronic apparel), a body attachment type (e.g., a skin pad or a tattoo) or a bio-implantable circuit. In some embodiments, the electronic device may be, for example, a television, a digital video disk (DVD) player, an audio playback device, a refrigerator, an air conditioner, a vacuum cleaner, an oven, a microwave oven, a washing machine, a set-top box, a home automation control panel, a security control panel, a media box (e.g., Samsung HomeSync™, Apple TV™, or Google TV™), a game console (e.g., Xbox™, PlayStation™, etc.) an electronic dictionary, an electronic key, a camcorder, or a digital photo frame.

In another embodiment, the electronic device may be a variety of medical devices (e.g., various portable medical measurement devices such as a blood glucose meter, a heart rate meter, a blood pressure meter or a temperature measuring device, magnetic resonance angiography (MRA), magnetic resonance imaging (MRI), computed tomography (CT), a camera, or ultrasonic device), a navigation system, global navigation satellite system (GNSS), event data recorder (EDR), flight data recorder (FDR), automobile infotainment device, marine electronic equipment (e.g., marine navigation apparatus, gyro compass, etc.), avionics, security devices, head unit for vehicles, industrial or domestic robots, drone, automatic teller machine (ATM) of financial institution, point of sales (POS) of store, or an object Internet appliance (e.g., a light bulb, various sensors, a sprinkler device, a fire alarm, a thermostat, a streetlight, a toaster, a fitness appliance, a hot water tank, a heater, boiler, etc.)

According to an embodiment, an external server may be embodied as a cloud server for storing an image, a cloud device, an external storage device, the above-described electronic devices, etc.

According to the present disclosure, the term 'user' may refer to a person who uses an electronic device or an apparatus (e.g., an artificial intelligence electronic device) that uses an electronic device.

FIG. 1 is a view to explain a system for compressing and encrypting an image by using a user key and storing the image in an external server according to an embodiment. The system may include a first electronic device 100-1, a second electronic device 100-2 and a server 200. The first electronic device 100-1 and the second electronic device 100-2 may be used by the same user, but the present disclosure is not limited thereto. The first electronic device 100-1 and the second electronic device 100-2 may be the same. In other words, a single electronic device may upload and download an image.

The first electronic device 100-1 may obtain an image. The image may be photographed by the first electronic device 100-1, but the present disclosure is not limited thereto. The image may be an image received from another electronic device, an image downloaded from a website, etc.

The first electronic device 100-1 may receive a user command for uploading an image to the server 200. The first electronic device 100-1 may receive a user command for uploading an image through menu items, but the present disclosure is not limited thereto. The first electronic device 100-1 may receive a user command for uploading an image to the server 200 through various user inputs.

The first electronic device 100-1 may acquire a user key of the first electronic device 100-1 for encrypting and compressing an image. The user key may be identification information of an electronic device (e.g., a serial number, International Mobile Equipment Identity (IMEI) information, etc., of an electronic device), but the present disclosure is not limited thereto. The user key could be a password input by a user. The user key may be a combination of the identification information of the electronic device and the password input by a user. The password input by the user may be a password that is initially input by a user. However, the password may be changed every time an image is transmitted or at a predetermined period of time.

The first electronic device 100-1 may acquire a characteristic value for uploading an image to the server 200 by using an image and a user key in response to a user command for uploading an image. The first electronic device 100-1 may acquire a characteristic value of the acquired image by inputting the acquired image and the user key of the first electronic device 100-1 to an encryption model which is trained to acquire a characteristic value by using an image and a user key as input data. The encryption model may be a deep neural network model, but the present disclosure is not limited thereto. The encryption model may encrypt an image by using an image and a user key, but simultaneously, compress an image and therefore, the encryption model may be referred to as a compression model.

A characteristic value may be an image representation value extracted by passing an image and a user key through the trained neural network as inputs, and used in various terms such as attribute value, feature vector, feature information, etc. The characteristic value may be obtained through the representation learning of the Deep Neural Network model.

A characteristic value obtained by inputting an image and a user key into an encryption model may be decrypted to a normal image only when both the characteristic value and the user key used for encrypting an image are necessarily used. The characteristic value obtained by inputting the image and the user key into the encryption model may not be decrypted to a normal image when only the characteristic value is input into the decryption model. Therefore, the encryption model and the decryption model may be trained in parallel. The decryption model may restore the compressed image into a normal image, and therefore, the decryption model may be referred to as a restoration model.

The first electronic device 100-1 may upload the acquired characteristic value to the server 200. The first electronic device 100-1 may transmit the acquired characteristic value together with identification information of the acquired image (e.g., an image name, an image generation date, an image generation position, etc.) to the server 200. The first electronic device 100-1 may transmit the acquired characteristic value and the identification information of the acquired image to the server 200 and generate a thumbnail image corresponding to an image. In this case, an original image may be deleted.

The server 200 may store and manage characteristic value received from the first electronic device 100-1. The server 200 may match and store the characteristic value acquired from the first electronic device 100-1 and the identification information of the acquired image. The server 200 may compare the similarities between the acquired image and another image based on the characteristic value, and classify the acquired image based on the similarity comparison. The server 200 may classify the characteristic value corresponding to the acquired image in vector form. The server 200 may provide a user with an image acquired according to a keyword or an image search request of the first electronic device 100-1 or the second electronic device 100-2.

The second electronic device 100-2 may receive a download command with respect to the image obtained from a user. The second electronic device 100-2 may receive a user command for downloading an image through menu items, but the present disclosure is not limited thereto. The second electronic device 100-2 may receive a user command for downloading an image from the server 200 through various user inputs.

The second electronic device 100-2 may transmit a request for downloading the acquired image to the server 200 in response to a download command. The request for downloading may include identification information of the acquired image.

The server 200 may retrieve a characteristic value corresponding to the acquired image based on the identification information of the acquired image and transmit the retrieved characteristic value to the second electronic device 100-2.

The second electronic device 100-2 may restore the acquired image by using the characteristic value received from the server 200 and the user key of the second electronic device 100-2. The second electronic device 100-2 may restore the acquired image by inputting the characteristic value received from the server 200 and the user key of the second electronic device 100-2 into the decryption model trained to acquire an image using the characteristic value and the user key as input data. An image may be properly restored even when the user key of the first electronic device 100-1 and the user key of the second electronic device 100-2 are the same.

The encryption model and the decryption model may be constructed in consideration of the application fields of the models or the computer performance of the electronic device. For example, the trained encryption model may be set to acquire a characteristic value by using a user key and an image as input data, and the trained decryption model may be set to restore an image by using a user key and a characteristic value as input data. The user key used to train the encryption model and the user key used to train the decryption model may be the same. To generate a characteristic value corresponding to an image using a user key and to restore an image using the generated characteristic value, the trained encryption model and decryption model may be, for example, a model based on a neural network. The encryption model and the decryption model may include a plurality of weighted network nodes that may be designed to simulate the human brain structure in a computer and simulate neurons of a human neural network. The plurality of network nodes may each establish a connection relationship so that the neurons simulate the synaptic activity of the neurons sending and receiving signals through the synapse. In addition, the encryption model and the decryption model may include, for example, a neural network model or a deep learning model developed from a neural network model. In the deep-learning model, a plurality of network nodes may be located at different depths (or layers), and may exchange data according to a convolution connection relationship. Examples of the encryption model and the decryption model may be Deep Neural Network (DNN), Recurrent Neural Network (RNN), and Bidirectional Recurrent Deep Neural Network (BRDNN), but the present disclosure is not limited thereto.

The first electronic device 100-1 and the second electronic device 100-2 may use an artificial intelligence agent to encrypt the image selected by a user as a characteristic value and upload the image to the server 200, and to download a characteristic value from the server 200 and restore the characteristic value into an image. The artificial intelligence agent may be a program only for providing an artificial intelligence (AI)-based service (e.g., speech recognition service, secretarial service, translation service, search service, etc.) that is executed by a general purpose processor (e.g., a central processing unit (CPU)) or a separate AI-specific processor (e.g., GPU, etc.). In particular, an artificial intelligence agent may control various modules to be described below.

Based on receiving a user input for uploading an image or a user input for downloading an image, an artificial intelligence agent may be operated. The artificial intelligence agent may encrypt an image as a characteristic value based on a user input and upload the characteristic value to the external server 200 or download the characteristic value stored in the external server 200 and restore the characteristic value to an image.

The artificial intelligence agent may operate based on a user input for uploading an image or a user input for downloading an image. The artificial intelligence agent may be executed before a user input for uploading an image or a user input for downloading an image is received. In this case, after a user input for uploading an image or a user input for downloading an image is received, the artificial intelligence agent may encrypt an image as a characteristic value and upload the characteristic value or download the characteristic value and restore the characteristic value into an image.

The artificial intelligence agent may be in a standby state before a user input for uploading an image or a user input for downloading an image is received. The standby state may be a state where receiving a user input predefined for controlling an operation start of the artificial intelligence agent is detected. While the artificial intelligence agent is in a standby state, when a user input for uploading an image or a user input for downloading an image is received, the first electronic device 100-1 or the second electronic device 100-2 may operate the artificial intelligence agent, encrypt an image as a characteristic value and upload the characteristic value or download the characteristic value and restore it into an image. The artificial intelligence agent may control various modules to be described below. The detailed description thereof will be made below.

Examples of the electronic device uploading or downloading an image using the trained encryption model or the trained decryption model will be described below.

Figure 2:
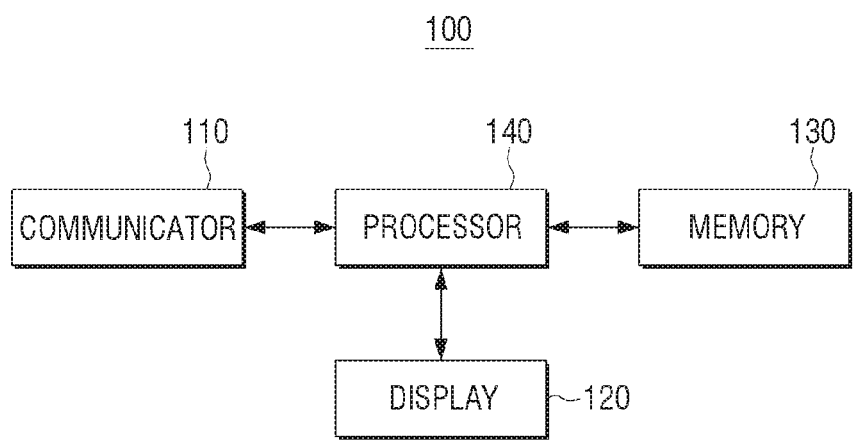
FIG. 2 is a schematic block diagram illustrating configuration of an electronic device according to an embodiment.

FIG. 2 is a schematic block diagram illustrating configuration of an electronic device according to an embodiment. As shown in FIG. 2, an electronic device 100 may include a communicator 110, a display 120, a memory 130 and a processor 140. FIG. 2 is an exemplary diagram illustrating configurations for implementing embodiments, and hardware/software configurations that could be apparent to those skilled in the art may be further included in the electronic device 100.

The communicator 110 may be a transceiver (transmitter and receiver) or communication interface that communicates with an external device or an external server according to various communication methods. The communicator 110 may transmit a characteristic value corresponding to an image to an external server in response to an image upload request of a user and receive a characteristic value corresponding to an image from an external server in response to an image download request of a user.

The display 120 may provide various screens. The display 120 may display a screen including at least one image (e.g., a picture). The display 120 may display a user interface (UI) for receiving various user commands such as an image upload command, an image download command, an image search command, etc.

Figure 4A:
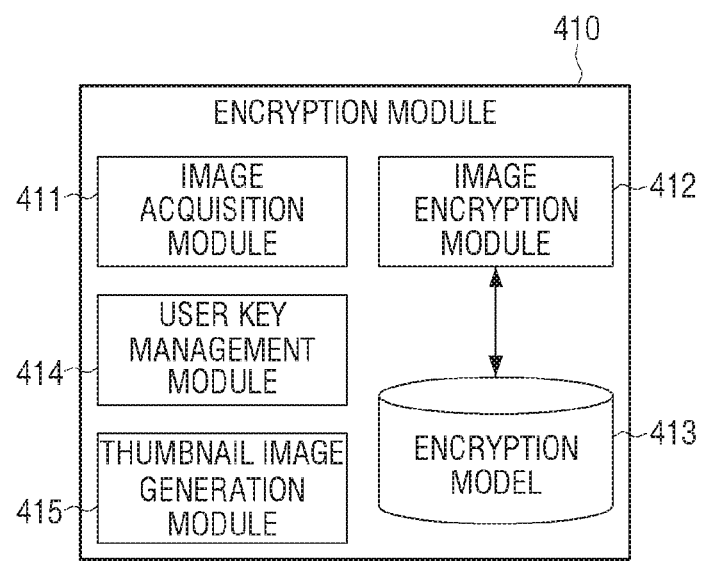
FIGS. 4A and 4B are block diagrams illustrating a module for encrypting an image and a module for decrypting an image according to an embodiment.
Figure 4B:
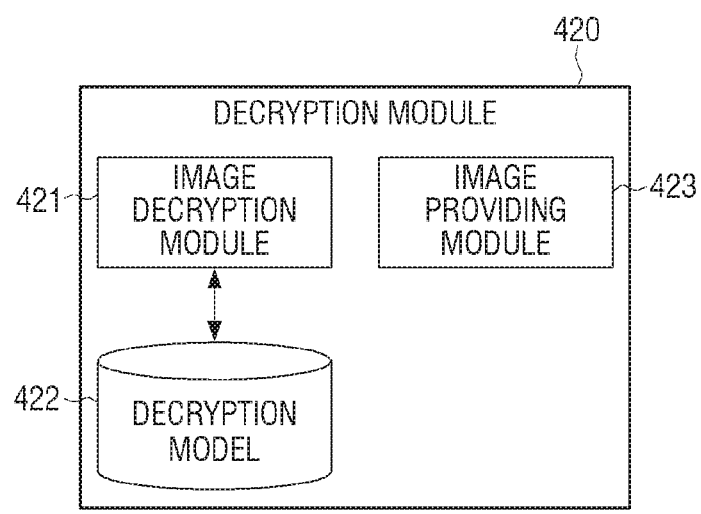

The memory 130 may store various programs and data for performing an operation of the electronic device 100. The memory 130 may store at least one of an encryption model trained to acquire a characteristic value with respect to an image using an image and a user key as input data and a decryption model trained to restore an image using a characteristic value and a user key as input data. The memory 130 may include an encryption module 410 and a decryption module 420 as shown in FIGS. 4A and 4B. The detailed description thereof will be made below with reference to FIGS. 4A and 4B.

The processor 140 may be electrically connected to the communicator 110, the display 120 and the memory 130 and control the overall operation and function of the electronic device 100. The processor 140 may encrypt an image into a characteristic value through the encryption module 410 and upload the characteristic value to an external server. Based on receiving an input signal according to a user command for uploading the acquired image to the external server 200, the processor 140 may acquire a characteristic value corresponding to the acquired image by inputting the acquired image and the user key of the electronic device to the encryption model 413 in response to an input signal and control the communicator 110 to transmit the identification information of the acquired image and the characteristic value to the external server 200.

The processor 140 may decrypt a characteristic value downloaded from an external server into an image through the decryption module 420. When an input signal according to a user command for downloading a characteristic value corresponding to the image uploaded to the external server 200 is received, the processor 140 may request a characteristic value to the external server 200 in response to an input signal, receive the characteristic value from the communicator 110, and restore an image corresponding to the characteristic value by inputting the received characteristic value and the user key into the decryption model 422.

Figure 3:
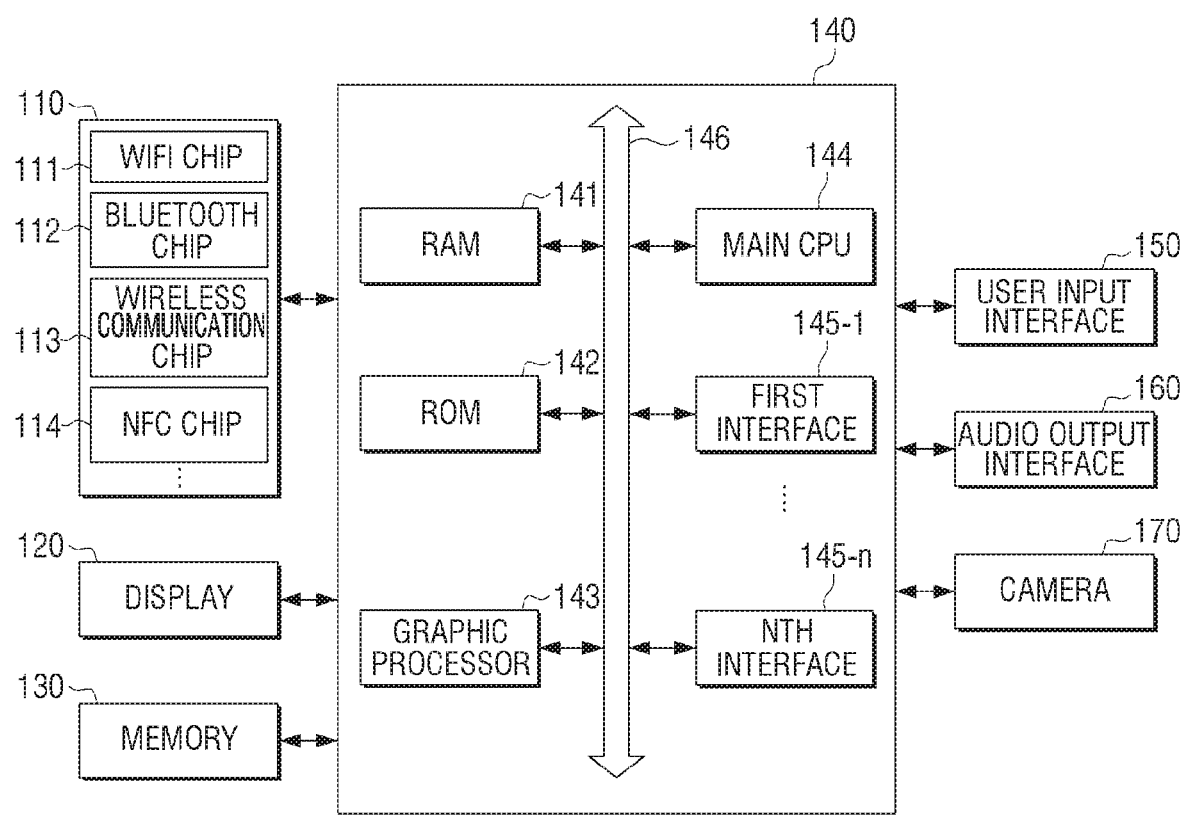
FIG. 3 is a detailed view illustrating configuration of an electronic device according to an embodiment.

FIG. 3 is a detailed view illustrating configuration of an electronic device according to an embodiment. Referring to FIG. 3, an electronic device 100 may include a communicator 110, a display 120, a memory 130, a processor 140, a user input interface 150, an audio output interface 160 and a camera 170.

The communicator 110 may perform communication with various types of external devices according to various types of communication methods. The communicator 110 may include at least one of a Wi-Fi chip 111, a Bluetooth chip 112, a wireless communication chip 113 and a near-field communication (NFC) chip 114. The processor 140 may perform communication with an external server or various external devices by using the communicator 110. The communicator 110 may perform communication with an external cloud server.

The display 120 may display image data processed by an image processor on a display area (or a display). The display area may be at least part of the display 120 exposed on one surface of a housing of the electronic device 100.

At least part of the display 120 may be disposed on at least one of a front surface area, a side surface area and a rear surface area of the electronic device 100 in the form of a flexible display. The flexible display may be a thin and flexible substrate that may be bent, curved and rolled without damage, like a piece of paper.

The display 120 may be combined with a touch panel and embodied as a touch screen having a layer structure. The touch screen may function as a display while being configured to detect a touch input position, a touched area, and a touch input pressure in addition to a function of detecting a real touch and a proximity touch.

The memory 130 may store instructions or data related to at least one other component of the electronic device 100. In particular, the memory 130 may be implemented as a non-volatile memory, a volatile memory, a flash memory, a hard disk drive (HDD), or a solid state drive (SSD). The memory 130 may be accessed by the processor 140 and the processor 140 may read/write/modify/delete/update data. The term 'memory' in the present disclosure may include the memory 130, a read-only memory (ROM), a random-access memory (RAM) in the processor 140 or a memory card (e.g., a micro SD card, a memory stick, etc.) attached to the electronic device 100. In addition, the memory 130 may store programs and data for various screens to be displayed on the display area of the display 120.

The user input interface 150 may receive various user inputs and transmit the various user inputs to the processor 140. In particular, the user input interface 150 may include a touch sensor, a pen sensor (such as a digital pen sensor), a pressure sensor, or a key. The touch sensor may use, for example, at least one of an electrostatic type, a pressure sensitive type, an infrared type, and an ultrasonic type. The (digital) pen sensor may be, for example, part of a touch panel or may include a separate recognition sheet. The key may include, for example, a physical button, an optical key, or a keypad.

The user input interface 150 may acquire an input signal according to a user input for uploading an image or a user input for downloading an image. The user input interface 150 may transmit an input signal to the processor 140.

The audio output interface 160 may output various alarm sounds and voice messages in addition to various audio data where decoding, amplification, noise filtering, etc. are performed by an audio processor. The audio output interface 160 may be embodied as a speaker, but the present disclosure is not limited thereto. The audio output interface 160 may be embodied as an output terminal that outputs audio data.

The camera 170 may photograph an image through a lens. The camera 170 may be provided in front of or behind the electronic device 100. The camera 170 may be embodied in the electronic device 100, but the present disclosure is not limited thereto. The camera 170 may be provided outside the electronic device 100 and connect to the electronic device 100 in a wired or wireless manner.

The processor 140 (or a controller) may be a hardware processor, and control the overall operation of the electronic device 1100 using various programs stored in the memory 130.

The processor 140 may include a RAM 141, a ROM 142, a graphics processor 143, a main CPU 144, first to n interfaces 145-1 to 145-n and a bus 146. The RAM 141, the ROM 142, the graphics processor 143, the main CPU 144, the first to n interfaces 145-1 to 145-n, etc. may be connected to one another via the bus 146.

FIG. 4A is a block diagram illustrating an encryption module 410 for encrypting an image and FIG. 4B is a block diagram illustrating a decryption module 420 for decrypting an image according to an embodiment. An electronic device 100 may include both an encryption module 410 and a decryption module 420, but the present disclosure is not limited thereto. The electronic device 100 may include only one of the encryption module 410 and the decryption module 420.

The encryption module 410 may include an image acquisition module 411, an image encryption module 412, an encryption model 413, a user key management module 414 and a thumbnail image generation module 415.

The image acquisition module 411 may acquire an image for uploading to the external server 200 from the electronic device 100. The image acquisition module 411 may acquire an image photographed by the camera 170, an image transmitted from an external electronic device, and an image downloaded from a website.

Figure 5A:
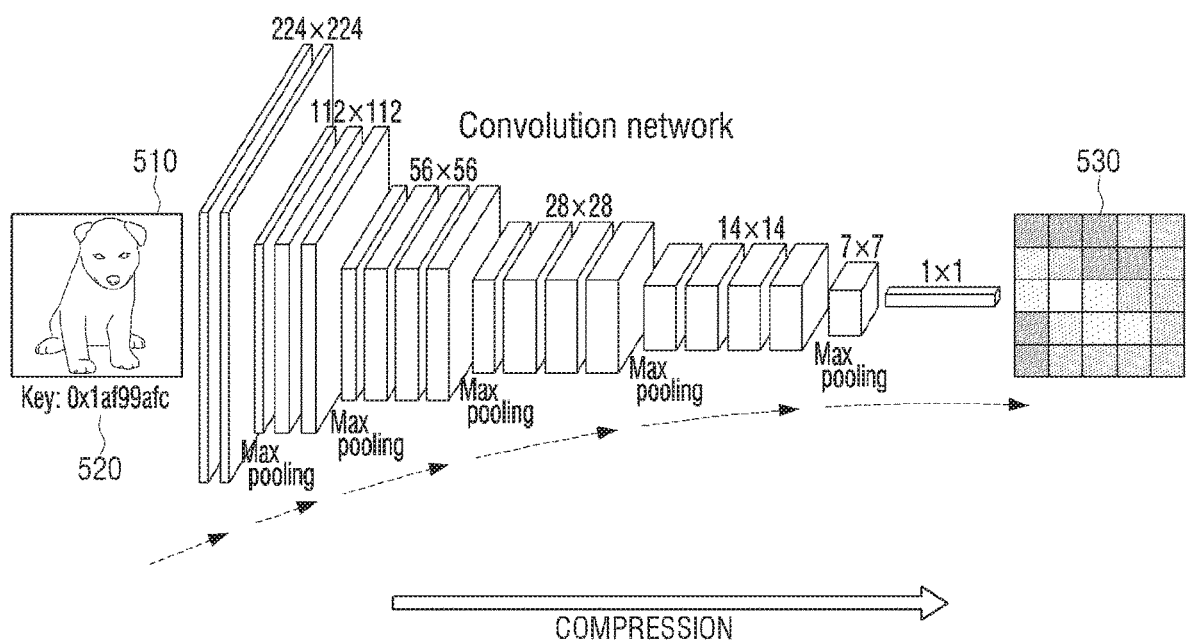
FIGS. 5A and 5B are views to explain a trained encryption model and a trained decryption model according to an embodiment.

The image encryption module 412 may encrypt an image by using the encryption model 413. The encryption model 413 may be a model trained to acquire a characteristic value 530 by using an image 510 and a user key 520 as input data shown in FIG. 5A. The encryption model 413 may be a Convolution Neural Network (CNN), but it is not limited thereto. The encryption model 413 may use various neural networks such as a generative adversarial network (GAN), a deep neural network (DNN), a recurrent neural network (RNN), a Bidirectional Recurrent Deep Neural Network (BRDNN), etc.

Figure 6A:
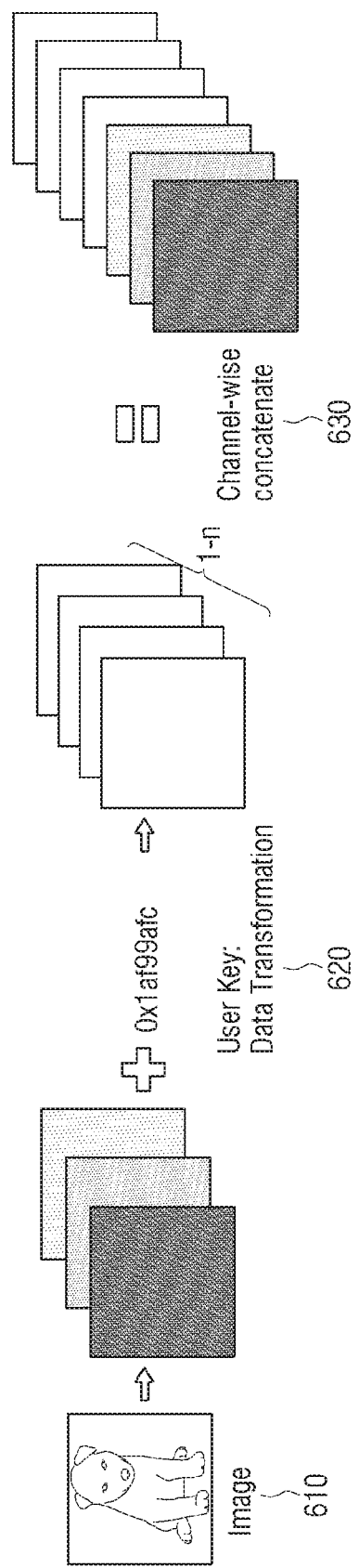
FIGS. 6A and 6B are views to explain a method for generating input data input into an encryption model according to an embodiment.

The image encryption module 412 may generate input data by using an image and a user key. The image encryption module 412 may generate input data by using an image and a user key in various manners For example, as shown in FIG. 6A, the image encryption module 412 may process an image 610 of three channels, such as red, green and blue (RGB), having a width and a height, and a user key 620 of N channels having a width and a height. The image encryption module 412 may generate input data 630 having (N+3) channels by concatenating the image 610 of three channels and the user key 620 of N channels. The image encryption module 412 may generate the input data 630 by concatenating the channel of the image 610 and the channel of the user key 620.

Figure 6B:
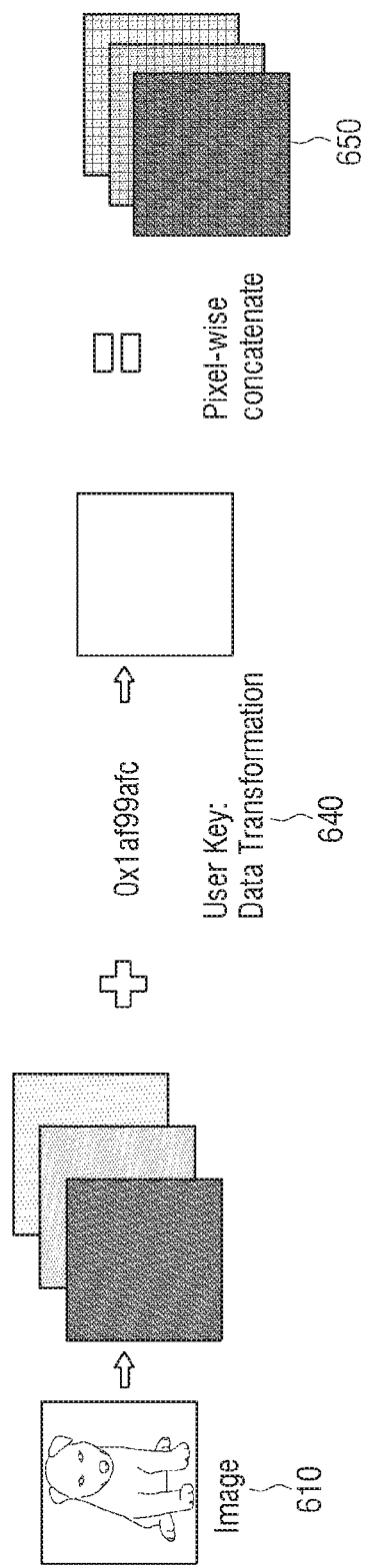

For another example, as shown in FIG. 6B, the image encryption module 412 may process an image 610 of three channels (RGB) having a width and a height and a user key 640 of one channel having a width and a height. The image encryption module 412 may generate input data 650 having three channels by summing pixels of the image 610 of three channels and pixels of the user key 640 of one channel. The image encryption module 412 may generate the input data 650 by summing pixel values of the image 610 and pixel values of the user key 640.

The structure and set values of the neural network may be changed according to the embodiments described in FIGS. 6A and 6B, respectively. In other words, depending on the type of input data, the input data size of the neural network, the number of layers constituting the neural network, the kernel size and channel number of each layer, the number of pooling layers, the pooling size, whether skip connection is applied, and whether Intermediate Feature and Top-down Feature are applied may be changed.

The image encryption module 412 may input the generated input data to the encryption model 413 including a plurality of layers. The input data may be extracted as a characteristic value having a smaller size by repeating the calculation of a plurality of layers. In other words, the input data may be calculated as a first characteristic value by passing through a first layer, the first characteristic value may be calculated as a second characteristic value by passing through a second layer, and the second characteristic value may be calculated as a third characteristic value having a smaller size by passing through a pooling payer. By repeating the above, input data may be calculated as a final characteristic value having a reduced size by passing through N layers.

The image encryption module 412 may acquire a characteristic value 530 calculated by passing the input data 630 or 650 through a plurality of layers. The acquired characteristic value 530 may be encrypted through a plurality of layers. In other words, the acquired characteristic value 530 may not be restored into an original image without a user key. The acquired characteristic value 530 may be compressed compared to a pervious image because the size of the characteristic value is reduced by passing through the pooling layer.

The user key management module 414 may manage a user key. Specifically, when a user key is identification information of the electronic device 100 (e.g., a serial number, IMEI information, etc.), the user key may not be changed. However, when the user key is a password that a user directly inputs, the user key may be changed periodically or non-periodically. Therefore, the user key management module 414 may mange version information on the user key changed by a user. The user key management module 414 may manage the history of the changed user key and use the changed user key when encrypting a characteristic value into an image.

According to another embodiment, when a user key is changed, the image encryption module 413 may encrypt the previously encrypted image again using the changed user key and transmit the encrypted image to the external server.

The thumbnail image generation module 415 may generate a thumbnail image corresponding to an encrypted image. The encrypted image may be uploaded to the server 200 as compressed, and thus the electronic device 100 may not need to store a high-capacity image. Therefore, the thumbnail image generation module 415 may generate a low-capacity thumbnail image corresponding to the encrypted image, match and store the generated thumbnail image and the identification information of the image.

The thumbnail image generation module 415 may group pixels that constitute an image and generate a thumbnail image based on a representative value of the pixels included in a group (e.g., a mean value, a median value, a mode value, etc.). For example, when an encrypted image is transmitted to the server 200 and the thumbnail image generation module 415 generates a thumbnail image, an original image may be deleted.

Based on receiving a request for displaying a low-resolution image from a user, the electronic device 100 may retrieve a thumbnail image generated by the thumbnail image generation module 415 and provide the image to a user, and based on receiving a request for displaying a high-resolution image from a user, the electronic device 100 may download a characteristic value stored in the external server 200, input the downloaded characteristic value into a decryption module, restore the characteristic value into an image and provide the image to a user.

Referring to FIG. 4B, the decryption module 420 may include an image decryption module 421, a decryption model 422 and an image providing module 423.

The image decryption module 421 may restore the characteristic value received from the external server 200 into an original image by using the decryption model 422. The decryption model 422 may be a model trained to restore an image by using a characteristic value and a user key as input data.

Figure 5B:
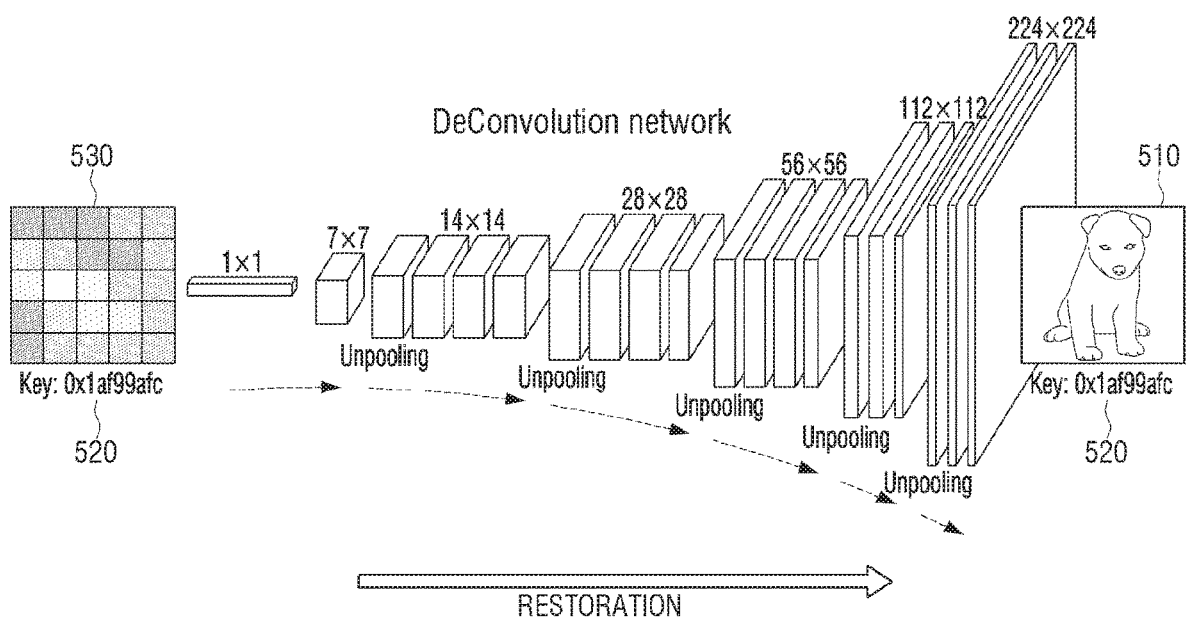

Referring to FIG. 5B, the decryption model 422 may be a model trained to acquire the image 510 by using the characteristic value 530 and the user key 520 as input data. The decryption model 422 may be embodied as Deconvolution Neural Network. The Deconvolution Neural Network may be mirrored from the convolution Neural Network used as the encryption model 413 and use an unpooling layer instead of a pooling layer. The Deconvolution Neural Network may store each pixel position value and perform an unpooling operation by using the stored pixel position value. Deconvolution Neural Network used as the decryption model 422 in the present disclosure may be trained in parallel with the Convolution Neural Network used as the encryption model 413.

The decryption model 422 may use the Deconvolution Neural Network, but the present disclosure is not limited thereto. The decryption model 422 may use another neural network such as Generative Adversarial Network (GAN). When the GAN is used for restoring an image, the electronic device 100 may restore an image of higher resolution than an original image.

The image decryption module 421 may input the characteristic value 530 downloaded from the server 200 and the user key 520 into the decryption model 422 trained as input data and restore the image 510.

The image providing module 423 may provide the restored image to a user. The image providing module 423 may provide a restored image in a full screen, but it is not limited thereto, and may provide the restored image in various screens such as a picture in picture (PIP) screen. The image providing module 423 may store the restored image in the memory 130 of the electronic device 100.

Figure 7:
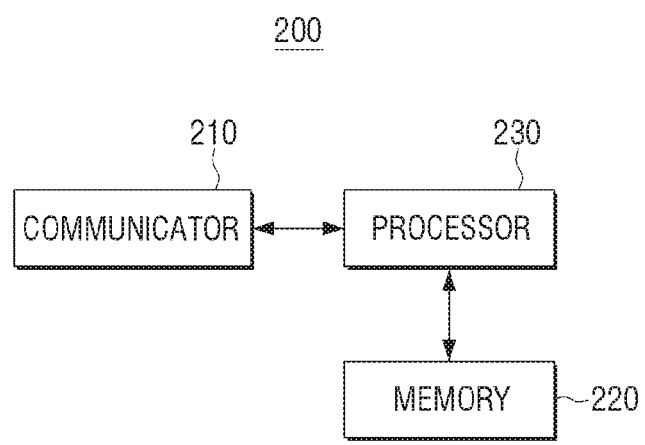
FIG. 7 is a schematic block diagram illustrating configuration of an external server according to an embodiment.

FIG. 7 is a schematic block diagram illustrating configuration of an external server according to an embodiment. Referring to FIG. 7, a server 200 may include a communicator 210, a memory 220, and a processor 230.

The communicator 210 may be a transceiver (transmitter and receiver) or communication interface that communicates with external electronic devices. The communicator 210 may receive identification information of an image and a characteristic value of an image from the external electronic devices 100. The communicator 210 may transmit a characteristic value to the external electronic devices 100 in response to a search request or a download request.

The memory 220 may match and store the identification information of the image received from the external electronic devices 100 and the characteristic value of the image. The memory 220 may store information on the similarity of the image together with the identification information of the image and the characteristic value of the image.

The processor 230 may control the overall operation of the server 200. Based on receiving the identification information of the image and the characteristic value of the image from the electronic device 100, the processor 230 may match the identification information of the image with the characteristic value of the image and the store the result in the memory 220. Based on further receiving the version information of the user key corresponding to the acquired image among the plurality of user keys from the electronic device 100, the processor 230 may also store the version information on the user key.

The processor 230 may compare the similarity between the acquired image and another image based on the characteristic value and classify the acquired image based on the similarity comparison. The processor 230 may store a characteristic value for each similarity.

Based on receiving an image download request including the identification information of the image from the electronic device 100, the processor 230 may retrieve a characteristic value of the image to be downloaded based on the identification information of the image. The processor 230 may control the communicator 210 to transmit the characteristic value of the retrieved image to the electronic device 100.

The processor 230 may transmit only the characteristic value of the retrieved image to the electronic device 100, but the present disclose is not limited thereto. The processor 230 may control the communicator 210 to transmit the characteristic value of the retrieved image together with the version information of the user key.

Based on receiving an image search request including a characteristic value or a keyword of the image from the electronic device 100, the processor 230 may retrieve a search image related to the characteristic value or the key word of the received image based on the image similarity.

Figure 8B:
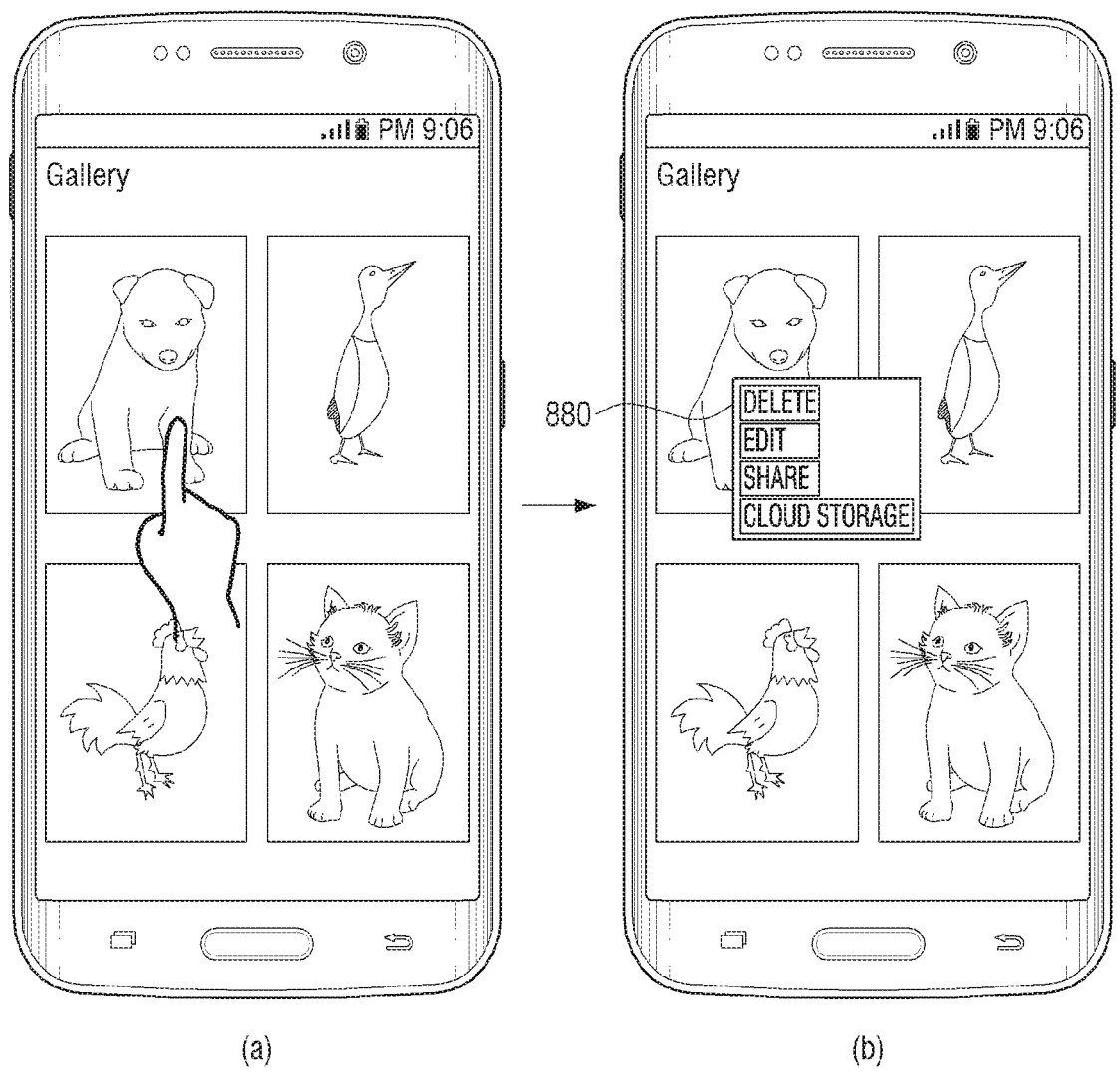

FIGS. 8A and 8B are views to explain a method for encrypting and uploading an image by using an encryption model according to an embodiment.

The electronic device 100 may receive an upload command with respect to an image at step S810. Referring to (a) of FIG. 8B, the electronic device 100 may display an application screen including a plurality of images. The plurality of images may be images photographed by the camera 170, but the present disclosure is not limited thereto. The images may be various such as an image received from an external apparatus, an image downloaded from a website, a captured screen of the electronic device 100, etc. Based on a user command for selecting one of the plurality of images being received, the electronic device 100 may display a menu 880 at the periphery of the selected image as shown in (b) of FIG. 8B. Based on an item "cloud storage" among the items in the menu 880 being selected, the electronic device 100 may receive an image upload command for storing the selected image in the external cloud server 200. As described above, the electronic device 100 may receive an image upload command using the menu 880, but the present disclosure is not limited thereto. The electronic device 100 may receive an upload command with respect to an image in various manners. For example, when a preset button included in the electronic device 100 (e.g., a button for executing an artificial intelligence program) is selected and a command for uploading an image is input, the electronic device 100 may receive an image upload command.

The electronic device 100 may acquire a user key in response to an upload command with respect to an image at step S820. The electronic device 100 may acquire the identification information of the electronic device 100 as a user key, and acquire a password set by a user as a user key. The password set by a user may be a password for an application for uploading an image, and a password for the selected image. The electronic device 100 may generate a new value based on the identification information of the electronic device 100 and the password set by a user.

The electronic device 100 may acquire a characteristic value by inputting an image and a user key into an encryption model at step S830. The electronic device 100 may generate input data by using an image and a user key, and acquire a characteristic value corresponding to an image by inputting the generated input data into an encryption model.

The electronic device 100 may transmit the identification information and the characteristic value of the image to the server 200 at step S840. The image identification information may be various information such as an image name, an image generation date, an image generation position, etc. The electronic device 100 may transmit the identification information and the characteristic value of the image, but the present disclosure is not limited thereto. The electronic device 100 may transmit the identification information, the characteristic value and version information of the user key.

The electronic device 100 may generate a thumbnail image after transmitting the identification information and the characteristic value of the image to the external server 200 at step S850. The electronic device 100 may compress and store an image of high resolution in the external server 200 and generate and store a thumbnail image of low resolution in the external server 200. The electronic device 100 may match and store a low-resolution thumbnail image and the identification information of the image.

The server 200 may match and store the image identification information and the characteristic value received from the electronic device 100 at step S860. The server 200 may store the version information of the user key together with the image identification information and the characteristic value.

The server 200 may classify the image based on the similarity comparison of the characteristic value at step S870. The server 200 may perform similarity comparison based on the characteristic values represented by vector and classify the image through a classifier in a feature space and manage the image. By classifying and managing the image, it becomes possible to search for images based on feature values when searching for images later.

Figure 9A:
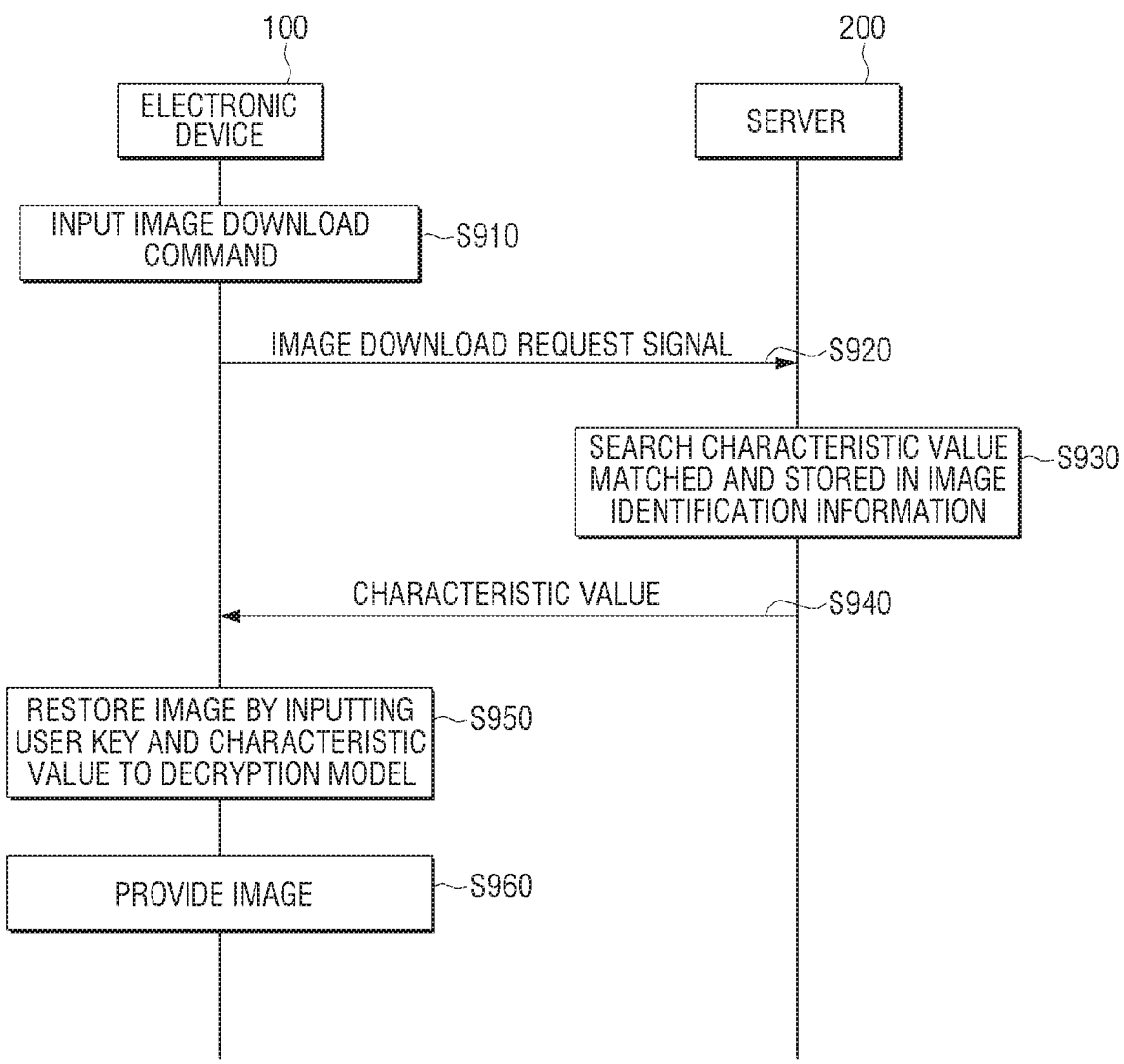
FIGS. 9A and 9B are views to explain a method for downloading and decrypting an image by using a decryption model according to an embodiment.
Figure 9B:
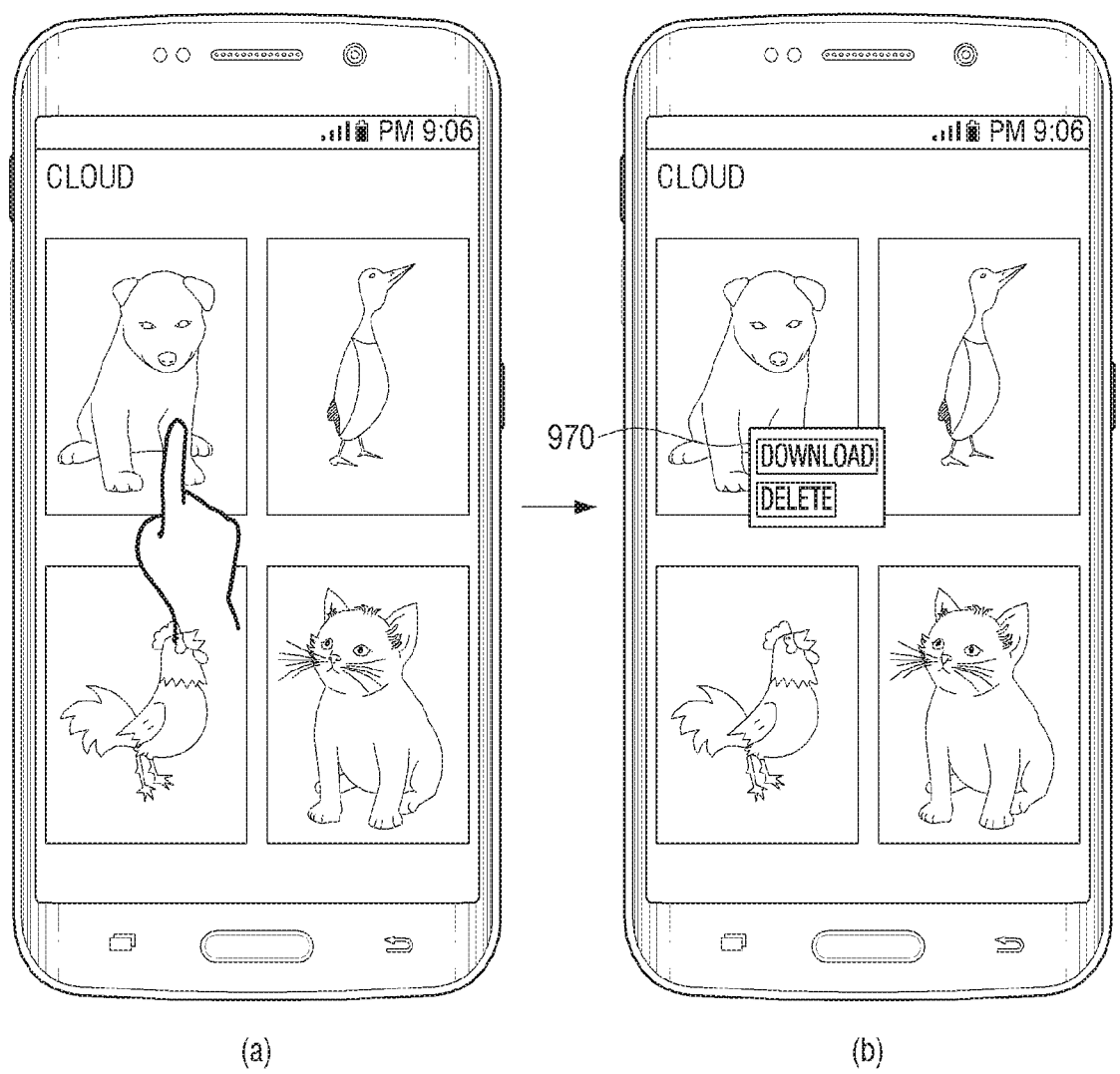

FIGS. 9A and 9B are views to explain a method for downloading and decrypting an image by using a decryption model according to an embodiment.

The electronic device 100 may receive an image download command at step S910. Referring to (a) of FIG. 9B, the electronic device 100 may display thumbnail images corresponding to a plurality of images stored in the server 200. The thumbnail image may be a thumbnail image generated at step S850 of FIG. 8A. When one of the plurality of thumbnail images is selected, as shown in (b) of FIG. 9B, the electronic device 100 may display a menu 970 at the periphery of the selected thumbnail image. When a 'download' item among the items displayed on the menu 970 is selected, the electronic device 100 may receive an image download command. However, as described above, receiving an image download command through the menu 970 is only an example embodiment, but the electronic device 100 may receive an image download command using another method.

The electronic device 100 may transmit a download request signal for an image corresponding to the selected thumbnail image to the server 200 at step S920. The download request signal may include identification information of an image corresponding to the selected thumbnail image.

The server 200 may retrieve a stored characteristic value which is matched with the identification information of the image at step S930. The server 200 may retrieve a characteristic value matched with the identification information of the received image among the characteristic values stored in the memory 220.

The server 200 may transmit the retrieved characteristic value to the electronic device at step S940. The server 200 may transmit only the retrieved characteristic value to the electronic device 100, but the present disclosure is not limited thereto. The server 200 may transmit the version information of the user key together with the characteristic value to the electronic device 100.

The electronic device 100 may input the user key and the characteristic value into the decryption model and restore an image at step S950. The electronic device 100 may restore an image corresponding to the characteristic value by inputting the user key and the characteristic value into the decryption model as the input data. When a user key is different from a user key (or a user key version) used for encrypting an image, the electronic device 100 may not restore an image corresponding to a characteristic value. However, when a user key is the same as a user key used for encrypting an image, the electronic device 100 may restore an image corresponding to a characteristic value using the decryption model. The decryption model may be trained in parallel with the encryption model. The electronic device 100 may restore an original image, but it is only an example embodiment. The electronic device 100 may restore an image of higher resolution than an original image by using GAN.

The electronic device 100 may provide the restored image at step S960. The electronic device 100 may display the restored image on the screen shown in (b) of FIG. 9B. The electronic device 100 may store the restored image in the memory 130 of the electronic device 100.

Figure 10A:
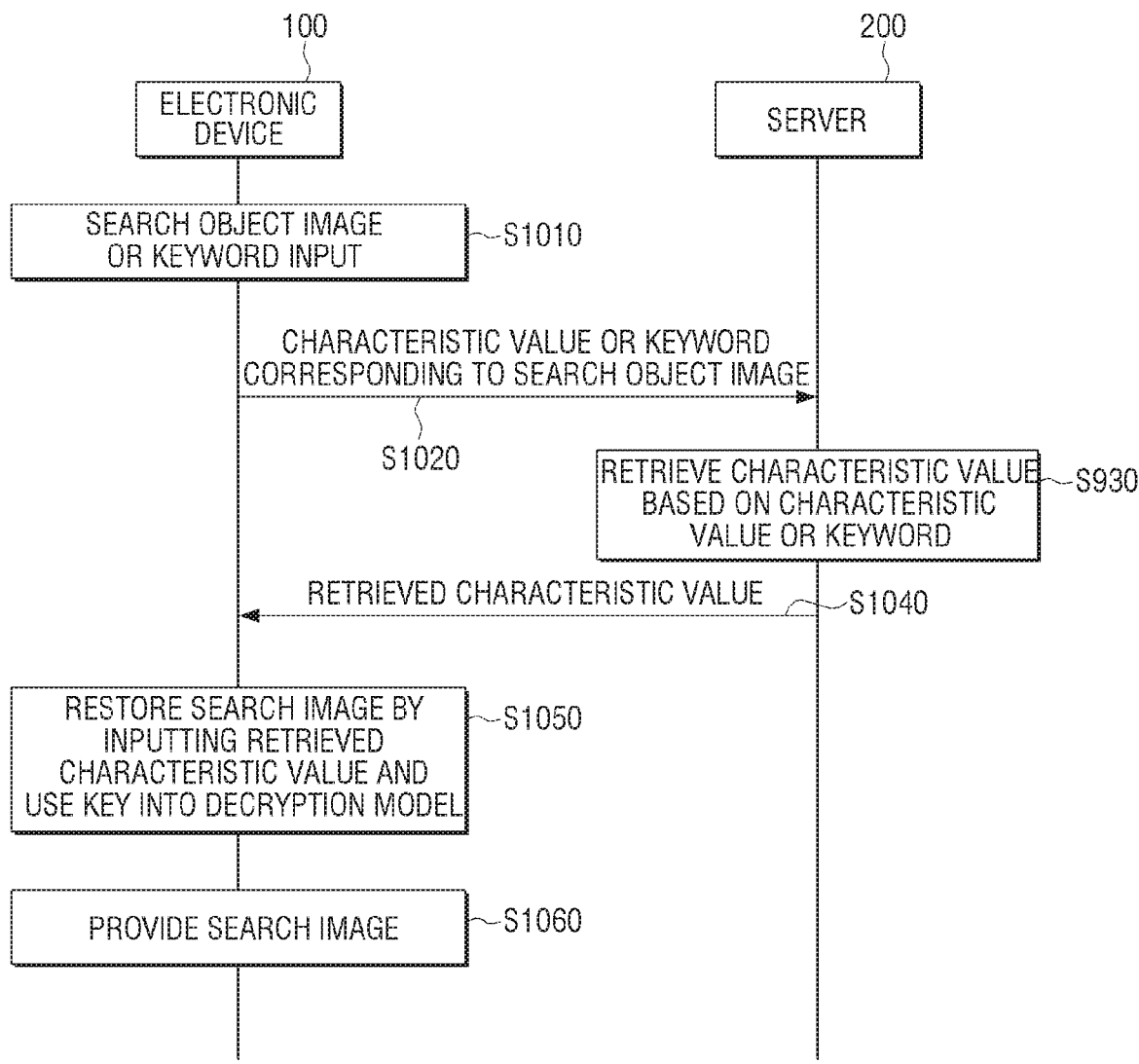
FIGS. 10A and 10B are views to explain a method for retrieving an image by using a decryption model and decrypting the image according to an embodiment.
Figure 10B:
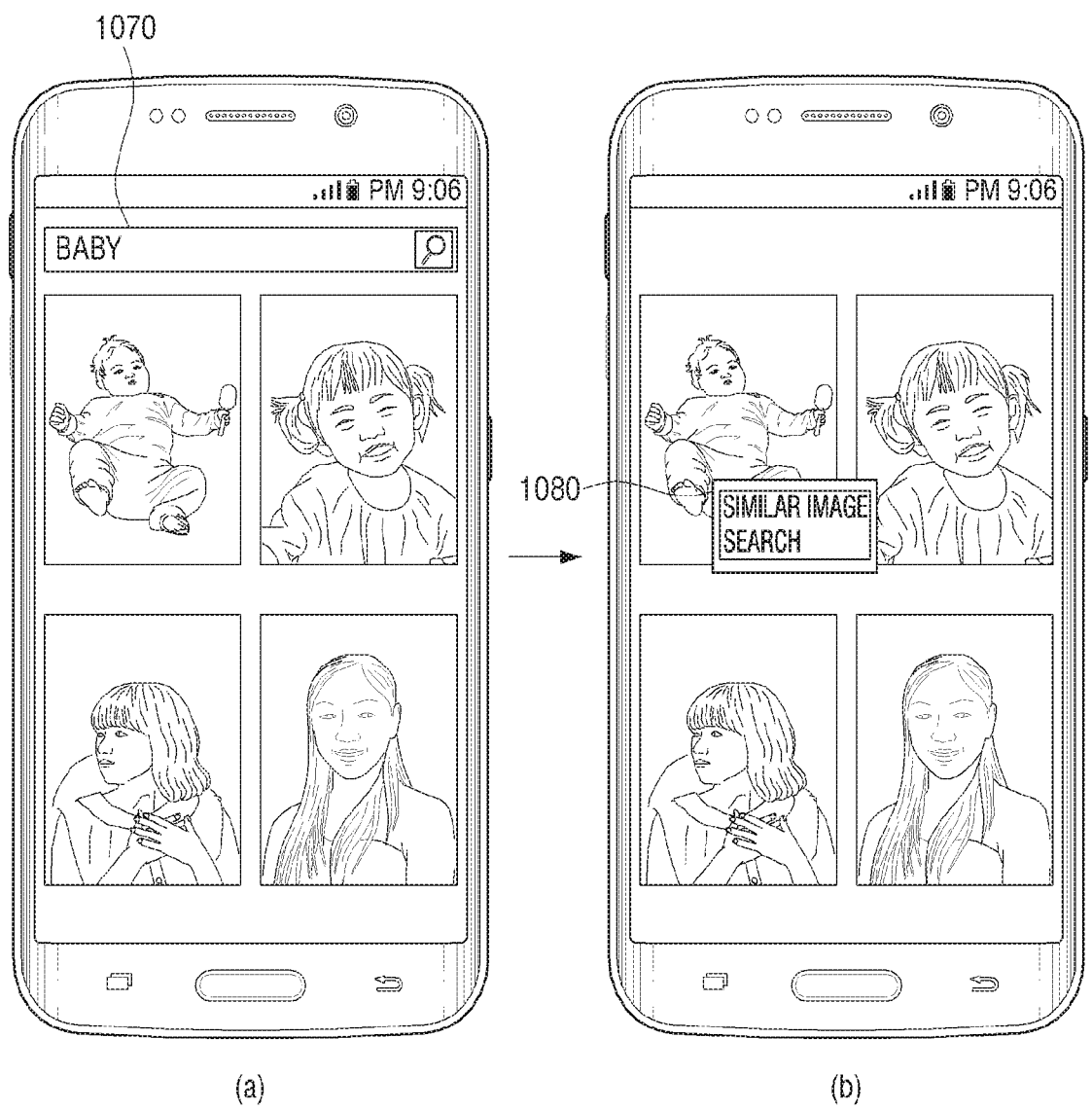

FIGS. 10A and 10B are views to explain a method for retrieving an image and decrypting the image by using a decryption model according to an embodiment.

The electronic device 100 may receive a search object image or a keyword at step S1010. For example, as shown in (a) of FIG. 10B, the electronic device 100 may receive a keyword in a search field 1070. For another example, as shown in (b) of FIG. 10B, the electronic device 100 may receive a search object image for retrieving a similar image through a menu 1080. When the search object image is selected, the electronic device 100 may input the selected search object image and the user key into the encryption model and acquire a characteristic value corresponding to the search object image.

The electronic device 100 may transmit a characteristic value or a keyword corresponding to the search object image to the server 200 at step S1020.

The server 200 may retrieve a characteristic value corresponding to a search image to be retrieved based on a characteristic value or a key word corresponding to a search object image at step S1030. The server 200 may classify and store characteristic values according to the similarity. The server 200 may retrieve a characteristic value classified in a similar manner to a characteristic value corresponding to the received search object image. When the server 200 classifies the characteristic values according to the similarity, the images may be classified according to an object included in an image. When an image is classified according to an object included in the image, the server 200 may retrieve a characteristic value corresponding to an image having an object corresponding to the received keyword.

The server 200 may transmit the retrieved characteristic value to the electronic device 100 at step S1040. The server 200 may transmit the version information of the user key used for encrypting the characteristic value together with the retrieved characteristic value.

The electronic device 100 may restore a search image by inputting the retrieved characteristic value and the user key into the decryption model at step S1050. The electronic device 100 may restore a search image corresponding to the characteristic value retrieved by inputting a user key and a characteristic into a decryption model as input data.

The electronic device 100 may provide a search image at step S1060.

In other words, as described above, a user may retrieve an image desired by a user among the encrypted images which are stored in the server 200 by using the characteristic values classified based on the similarity.

Figure 11:
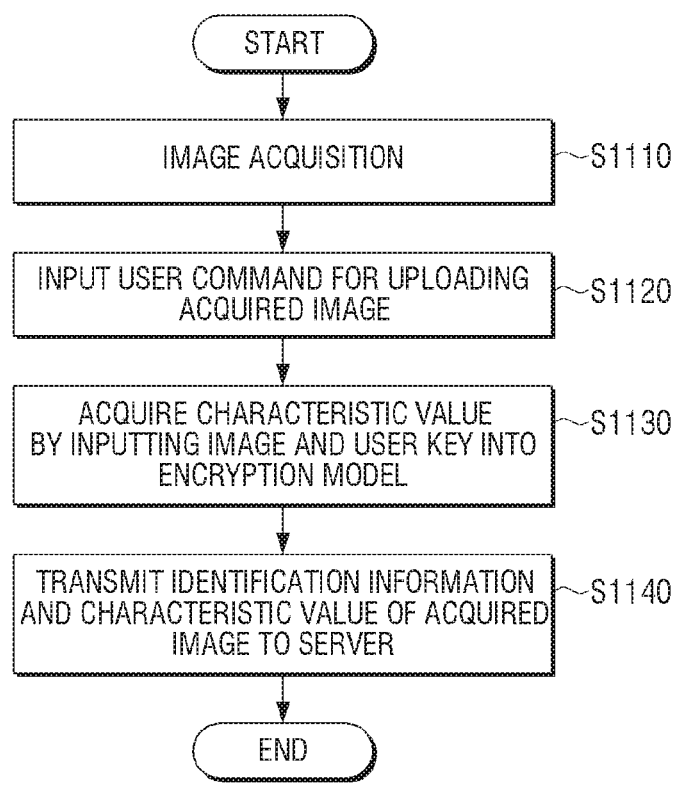
FIG. 11 is a flowchart to explain a method for encrypting an image by using an encryption model and uploading the image to an external server according to an embodiment.

FIG. 11 is a flowchart to explain a method for encrypting an image and uploading the image to an external server by using an encryption model according to an embodiment.

The electronic device 100 may acquire an image at step S1110. The image may be an image photographed by the camera 170, but the present disclosure is not limited thereto. The image may be an image received from an external apparatus, an image downloaded from a website, a captured screen of the electronic device 100, etc.

The electronic device 100 may receive a user command for uploading the acquired image at step S1120. The electronic device 100 may receive a user command for uploading an image through the menu 880 shown in (b) of FIG. 8B, but the present disclosure is not limited thereto. The electronic device 100 may receive a user command for uploading an image using in various manners.

The electronic device 100 may acquire a characteristic value by inputting an image and a user key into an encryption model at step S1130. The electronic device 100 may generate input data by using an image and a user key. The electronic device 100 may acquire a characteristic value of small capacity by inputting the generated input data into the trained encryption model.

The electronic device 100 may transmit the identification information and the characteristic value of the acquired image to the server 200 at step S1140. The electronic device 100 may transmit the version information of the user key used when a characteristic value is generated to the server 200. The electronic device 100 may generate and store a thumbnail image of low resolution to display the image to a user even after transmitting the identification information and the characteristic value of the acquired image to the server 200.

As described above, the electronic device 100 may encrypt an image and upload the compressed characteristic value to the server 200 by generating a characteristic value using an image and a user key and transmitting the generated characteristic value to the server 200. When an image is uploaded to the external server 200, not only personal information may be protected but also a characteristic value of small capacity may be uploaded to the outside.

Figure 12:
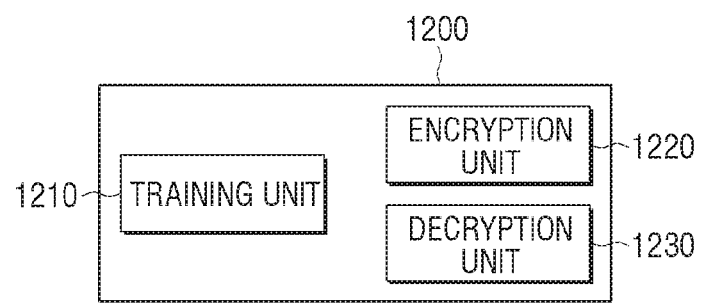
FIG. 12 is a block diagram illustrating configuration of an electronic device for training and using an encryption model and a decryption model according to an embodiment.

FIG. 12 is a block diagram illustrating configuration of an electronic device for training and using an encryption model and a decryption model according to an embodiment.

Referring to FIG. 12, a processor 1200 may include at least one of a training unit 1210, an encryption unit 1220, and a decryption unit 1230. The processor 1200 of FIG. 12 may correspond to a processor 140 of the electronic device 100 in FIG. 2 or a processor of a data training server.

The training unit 1210 may generate or train an encryption model for acquiring a characteristic value by inputting an image and a user key, and generate or train a decryption model for restoring an image by inputting a characteristic value and a user key. For example, the training unit 1210 may generate, train, or update an encryption model for acquiring a characteristic value corresponding to an image by using an image and a user key as training data. For another example, the training unit 1210 may generate, train, or update a decryption model for restoring an image by using a characteristic value and a user key as training data. The training unit 1210 may train an encryption model and a decryption model in parallel. In other words, when a characteristic value obtained by inputting a user key and an image into an encryption model as input data and a user key are input into a decryption model, the encryption model and the decryption model may be trained in parallel so that an image input into an encryption model may be restored.

The training unit 1210 may perform training of the encryption model and decryption model trained by the general image and the random user key by using the image and the user key stored in the electronic device 100. The training unit 1210 may maintain security of the user data and train the encryption model and the decryption model optimized to a user.

The encryption unit 1220 may use the image and the user key as input data of the trained encryption model and acquire a characteristic value corresponding to an image. The encryption unit 1230 may use a characteristic value and a user key as input data of the trained decryption model and restore an image corresponding to the characteristic value.

At least part of the training unit 1210 and at least part of the encryption unit 1220/the decryption unit 1230 may be embodied as a software module, or may be embodied in the form of at least one hardware chip and mounted on the electronic device. For example, at least one of the training unit 1210 and the encryption unit 1220/decryption unit 1230 may be embodied in the form of the hardware chip only for artificial intelligence (AI), or embodied as part of a general purpose processor (e.g., a CPU and an application processor) or a graphic processor (e.g., CPU) and mounted on the various electronic devices or the encryption/decryption apparatus. The hardware chip only for artificial intelligence may be a processor specialized in probability calculation and have a higher parallel processing performance than the general purpose processor, so that it is possible to quickly process calculation in the artificial intelligence field such as machine learning. When the training unit 1210 and the encryption unit 1220/decryption unit 1230 are implemented as a software module (or a program module including one or more instructions), the software module may be stored in a non-transitory computer readable media. In this case, the software module may be provided by an Operating System (OS) or by a predetermined application. Alternatively, some of the software modules may be provided by an OS, and some of the software modules may be provided by a predetermined application.

The training unit 1210 and the encryption unit 1220/the decryption unit 1230 may be mounted on one electronic device, or on respective electronic devices. For example, one of the training unit 1210 and the encryption unit 1220/the decryption unit 1230 may be included in the electronic device 100, and the other may be included in an external server. For another example, one of the encryption unit 1220 and the decryption unit 1230 may be included in a first electronic device 100-1. The other may be included in a second electronic device 100-2. In addition, the training unit 1210 and the encryption unit 1220/the decryption unit 1230 may provide model information established by the training unit 1210 to the encryption unit 122/the decryption unit 1230 in a wired or wireless manner, and the data input into the training unit 1210 may be provided to the training unit 1210 as additional training data.

Figure 13A:
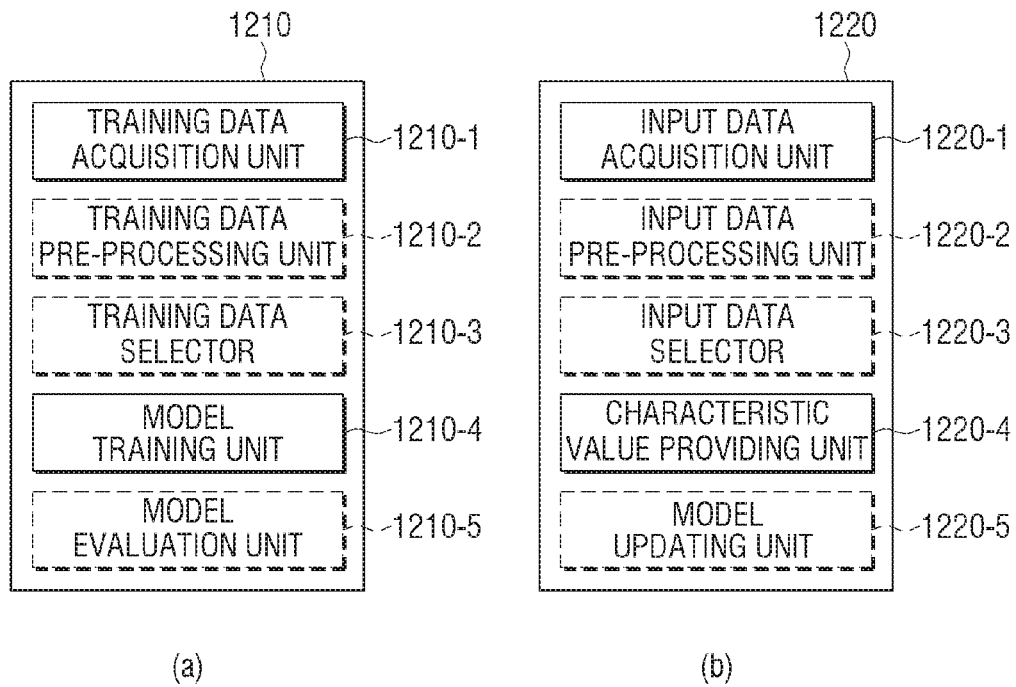
FIGS. 13A, 13B and 13C are block diagrams illustrating detailed configurations of a training unit, an encryption unit and a decryption unit according to an embodiment.
Figure 13A:
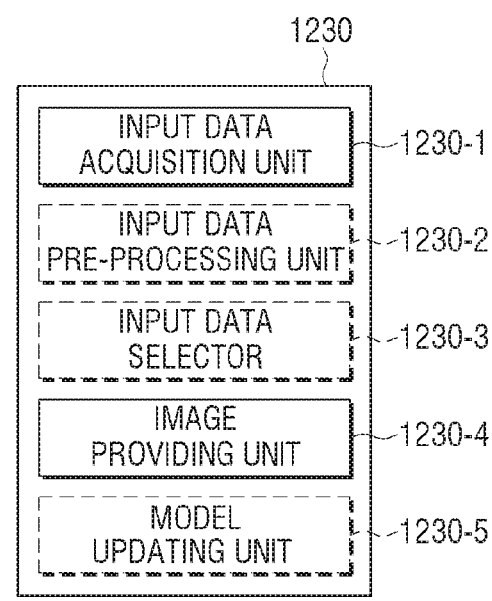

FIG. 13A is a block diagram illustrating a training unit 1210, an encryption unit 1220 and a decryption unit 1230 according to various embodiments.

Referring to (a) of FIG. 13A, the training unit 1210 according to an embodiment may include a training data acquisition unit 1210-1 and a model training unit 1210-4. The training unit 1210 may further include at least one of a training data pre-processing unit 1210-2, a training data selection unit 1210-3 and a model evaluation unit 1210-5.

The training data acquisition unit 1210-1 may acquire training data used for an encryption model and a decryption model. According to an embodiment, the training data acquisition unit 1210-1 may acquire an image and a random user key as training data. According to another example, the training data acquisition unit 1210-1 may acquire the image stored in the electronic device 100 and the user key of the electronic device 100 as training data for user optimization.

The model training unit 1210-4 may train an encryption model to acquire a characteristic value corresponding to an image using a user key, and a decryption model to restore an image corresponding to a characteristic value using a user key based on training data. For example, the model training unit 1210-4 may acquire a characteristic value by inputting a user key and an image into an encryption model, and train the encryption model and the decryption model to restore an image by inputting the acquired characteristic value and the user key into the decryption model.

In addition, the model training unit 1210-4 may train an encryption model by changing the number of layers constituting the encryption model, the kernel size and the number of channels of each layer, the number of pooling layers, the pooling size, whether skip connection is applied, whether or not the intermediate feature and the top-down feature are applied, etc. according to the type of input data. The model training unit 1210-4 may train a decryption model in parallel with the trained encryption model. Because the encryption model and the decryption model are trained in parallel, the training unit 1210 will be described below based on the encryption model.

The model training unit 1210-4 may train the encryption model through the supervised learning that uses at least part of the training data as a criterion. For example, the model training unit 1210-4 may perform self-training without any guidance, and thus train the encryption model through unsupervised learning that obtains a criterion for acquiring a characteristic value. The model training unit 1210-4 may train the encryption model through reinforcement learning using a feedback as to whether the result of the situation determination based on the learning is correct. The model training unit 1210-4 may also train an encryption model using, for example, a learning algorithm including error back-propagation method or gradient descent.

In addition, the model training unit 1210-4 may train screening criteria as to which learning data should be used to acquire a characteristic value by using the input data.

When there are a plurality of pre-established encryption models, the model training unit 1210-4 may determine an encryption model where the input training data is mostly relevant to basic training data as a training encryption model. The basic training data may be pre-classified by type of data. The encryption model may be pre-established by type of data. For example, the basic training data may be pre-classified based on various criteria such as an area where the training data is generated, a time at which the learning data is generated, a size of the learning data, a genre of the learning data, a creator of the learning data, etc.

When the encryption model is trained, the model training unit 1210-4 may store the trained encryption model. The model training unit 1210-4 may store the trained encryption model in the memory 130 of the electronic device 100. The model training unit 1210-4 may store the trained encryption model in a server memory connected in a wired/wireless manner.

The training unit 1210 may further include the training data pre-processing unit 1210-2 and the training data selection unit 1210-3 to improve the processing result of the encryption model or reduce the resource or time used for generating an encryption model.

The training data pre-processing unit 1210-2 may pre-process the acquired data so that the acquired data may be used for training the acquisition of a characteristic value. The training data pre-processing unit 1210-2 may manufacture the acquired data in a predetermined format so that the model training unit 1210-4 may use the acquired data for training the acquisition of the characteristic value. For example, as shown in FIGS. 6A and 6B, the training data pre-processing unit 1210-2 may process a user key and an image as input data.

The training data selection unit 1210-3 may select the data used for training from the data acquired from the training data acquisition unit 1210-1 and the data pre-processed by the training data pre-processing unit 1210-2. The selected training data may be provided to the model training unit 1210-4. According to the preset screening criteria, the training data selection unit 1210-3 may select training data used for training from the acquired or pre-processed data. The training data selection unit 1210-3 may select the training data according to a preset screening criteria by the training of the model training unit 1210-4.

The training unit 1210 may further include the model evaluation unit 1210-5 to improve the processing result of the encryption model.

When the evaluation data is input into the encryption model, and the processing result output from the evaluation data does not satisfy a predetermined criterion, the model evaluation unit 1210-5 may cause the model training unit 1210-4 to train again. The evaluation data may be predefined data for evaluating an encryption model.

For example, when the number or the ratio of the evaluation data for which the processing result is not correct out of the processing results of the trained encryption model for the evaluation data exceeds a predetermined threshold value, the model evaluation unit 1210-5 may evaluate that a predetermined criteria is not satisfied.

When there are a plurality of trained encryption models, the model evaluation unit 1210-5 may evaluate whether each of the trained encryption models satisfies a predetermined criterion, and determine a model that satisfies a predetermined criterion as a final encryption model. In this case, when there are a plurality of models that satisfy a predetermined criterion, the model evaluation unit 1210-5 may determine any one or a predetermined number of models previously set in order of highest evaluation score as a final encryption model.

Further, as described above, when the encryption model is trained, the training unit 1210 may train the decryption model to be mirrored to the encryption model.

Referring to (b) of FIG. 13A, the encryption unit 1220 according to some embodiments may include an input data acquisition unit 1220-1 and a characteristic value providing unit 1220-4. The encrypting unit 1220 may further include at least one of an input data pre-processing unit 1220-2, an input data selection unit 1220-3, a model updating unit 1220-5.

The input data acquisition unit 1220-1 may acquire data used for acquiring a characteristic value. The input data acquisition unit 1220-1 may acquire the image and the user key of the electronic device 100 as input data.

The characteristic value providing unit 1220-4 may acquire a characteristic value corresponding to an image by applying the data obtained from the input data acquisition unit 1220-1 to the trained encryption model. The characteristic value providing unit 1220-4 may provide the characteristic value corresponding to the image and the user key. The characteristic value providing unit 1220-4 may acquire the characteristic value by applying the data selected by the input data pre-processing unit 1220-2 or the input data selection unit 1220-3 to the encryption model as an input value.

The encryption unit 1220 may further include the input data pre-processing unit 1220-2 and the input data selection unit 1220-3 to improve the processing result of the encryption model or reduce resource or time for providing the processing result.

The input data pre-processing unit 1220-2 may pre-process the acquired data so that the acquired data may be used for acquiring a characteristic value. The input data pre-processing unit 1220-2 may manufacture the input data in a pre-defined format so that the characteristic value providing unit 1220-4 may use the input data for acquiring a characteristic value. As shown in FIGS. 6A and 6B, the input data pre-processing unit 1220-2 may process the input data.

The input data selection unit 1220-3 may select data used for acquiring a characteristic value from the data obtained from the input data acquisition unit 1220-1 or the data pre-processed by the input data pre-processing unit 1220-2. The selected data may be provided to the characteristic value providing unit 1220-4. The input data selection unit 1220-3 may select some or all of the acquired or pre-processed data according to a predetermined selection criterion for acquiring a characteristic value. The input data selection unit 1220-3 may select data according to a predetermined screening criteria by the training of the model training unit 1210-4.

The model updating unit 1220-5 may control the encryption model to be updated based on the evaluation with respect to the characteristic value provided by the characteristic value providing unit 1220-4. For example, the model updating unit 1220-5 may provide a characteristic value provided by the characteristic value providing unit 1220-4 to the model training unit 1210-4 and request the model training unit 1210-4 to further train or update the encryption model.

Referring to (c) of FIG. 13A, the decryption unit 1230 according to an embodiment may include the input data acquisition unit 1230-1 and the image providing unit 1230-4. The decryption unit 1230 may further include at least one of the input data pre-processing unit 1230-2, the input data selection unit 1230-3 and the model updating unit 1230-5.

The input data acquisition unit 1230-1 may acquire data used for restoring an image. For example, the input data acquisition unit 1230-1 may acquire the user key and the characteristic value acquired from the server 200 as input data. The image providing unit 1230-4 may provide an image corresponding to a characteristic value by applying the data acquired from the input data acquisition unit 1230-1 to the trained decryption model as input value. The image providing unit 1230-4 may restore an image corresponding to a characteristic value and a user key. The image providing unit 1230-4 may restore an image by applying the data selected by the data pre-processing unit 1230-2 or the input data selection unit 1230-3 to the decryption model as an input value.

The decryption unit 1230 may further include the input data pre-processing unit 1230-2 and the input data selection unit 1230-3 to improve the processing result of the decryption model and reduce the resource or time for providing the processing result.

The input data pre-processing unit 1230-2 may pre-process the acquired data so that the acquired data may be used for restoring an image. The input data pre-processing unit 1230-2 may manufacture the input data in a pre-defined format so that the image providing unit 1230-4 may use the input data for restoring an image.

The input data selection unit 1230-3 may select the data used for restoring an image from the data obtained from the input data acquisition unit 1230-1 or the data preprocessed by the input data pre-processing unit 1230-2. The selected data may be provided to the image providing unit 1230-4. The input data selection unit 1230-3 may select some or all of the acquired or pre-processed data according to a preset screening criteria for restoring an image.

The model updating unit 1230-5 may control the decryption model to be updated based on the evaluation of an image provided by the image providing unit 1230-4. For example, the model updating unit 1230-5 may provide the image provided by the image providing unit 1230-4 to the model training unit 1210-4 and request that the model training unit 1210-4 may further train or update the decryption model.

Figure 13B:
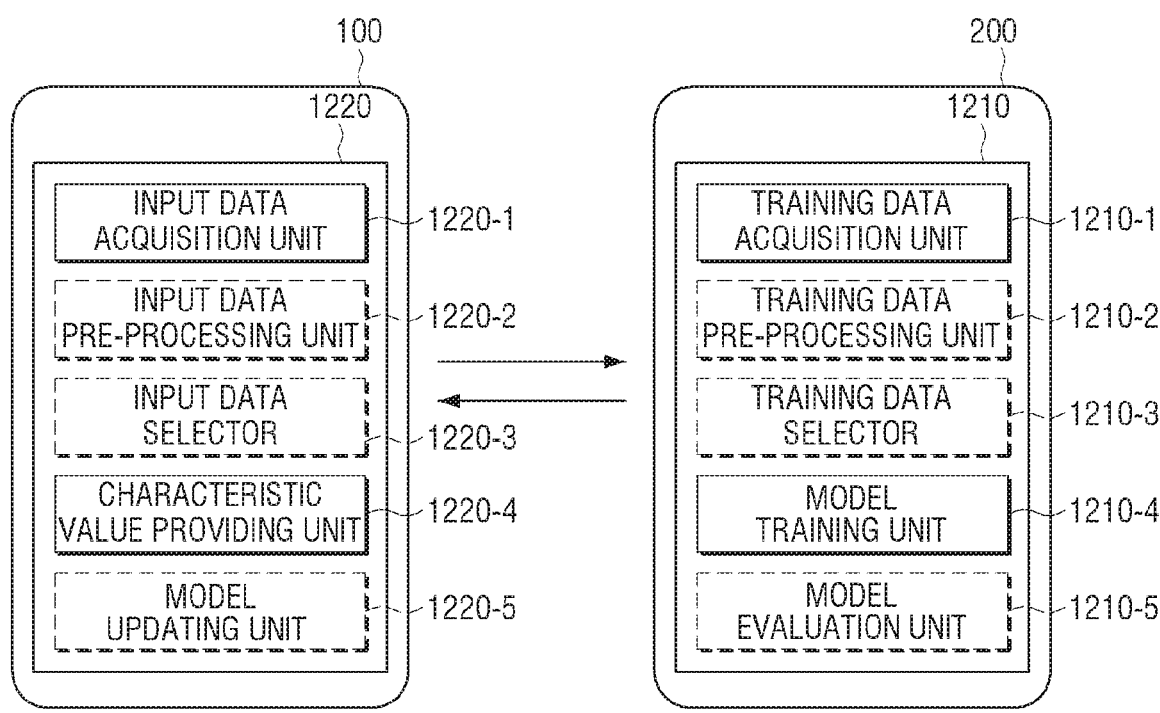

FIG. 13B is a view illustrating an example of training an encryption model and acquiring a characteristic value when the electronic device 100 operates in association with the external server 200 according to an embodiment.

Referring to FIG. 13B, the external server 200 may train a criterion for the decryption model to acquire a characteristic value, and the electronic device 100 may acquire a characteristic value by using the encryption model generated based on the training result by the server 200.

The model training unit 1210-4 of the server 200 may perform a function of the training unit 1210 shown in FIG. 12. The characteristic value providing unit 1220-4 of the electronic device 100 may acquire the characteristic value corresponding to the image by applying the data selected by the input data selection unit 1220-3 to the encryption model generated by the server 200.

The characteristic value providing unit 1220-4 of the electronic device 100 may receive the encryption model generated by the server 200 from the server 200, and acquire a characteristic value corresponding to an image by using the received encryption model. The characteristic value providing unit 1220-4 of the electronic device 100 may apply the input data selected by the input data selection unit 1220-3 to the encryption model received from the server 200 and acquire a characteristic value corresponding to the image.

Figure 13C:
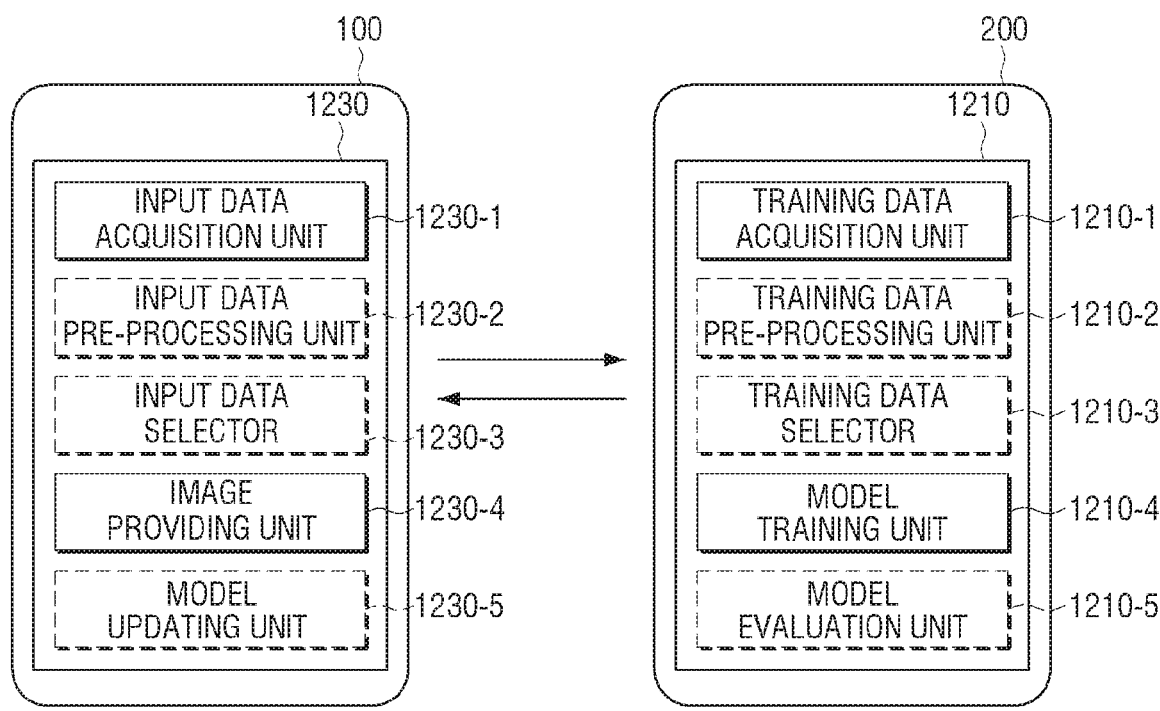

FIG. 13C is a view illustrating an example of training a decryption model and restoring an image when the electronic device operates in association with the external server 200 according to an embodiment.

Referring to FIG. 13C, the external server 200 may train a criterion for the decryption model to restore an image, and the electronic device 100 may restore an image by using the decryption model generated based on the training result by the server 200.

The model training unit 1210-4 of the server 200 may perform the function of the training unit 1210 shown in FIG. 12. The image providing unit 1230-4 of the electronic device 100 may acquire an image corresponding to the characteristic value by applying the data selected by the input data selection unit 1230-3 to the decryption model generated by the server 200.

The image providing unit 1230-4 of the electronic device 100 may receive the decryption model generated by the server 200 from the server 200, and restore the image corresponding to the characteristic value by using the received decryption model. The image providing unit 1230-4 of the electronic device 100 may restore the characteristic value corresponding to the image by applying the input data selected by the input data selection unit 1230-3 to the decryption model received from the server 200.

Figure 14:
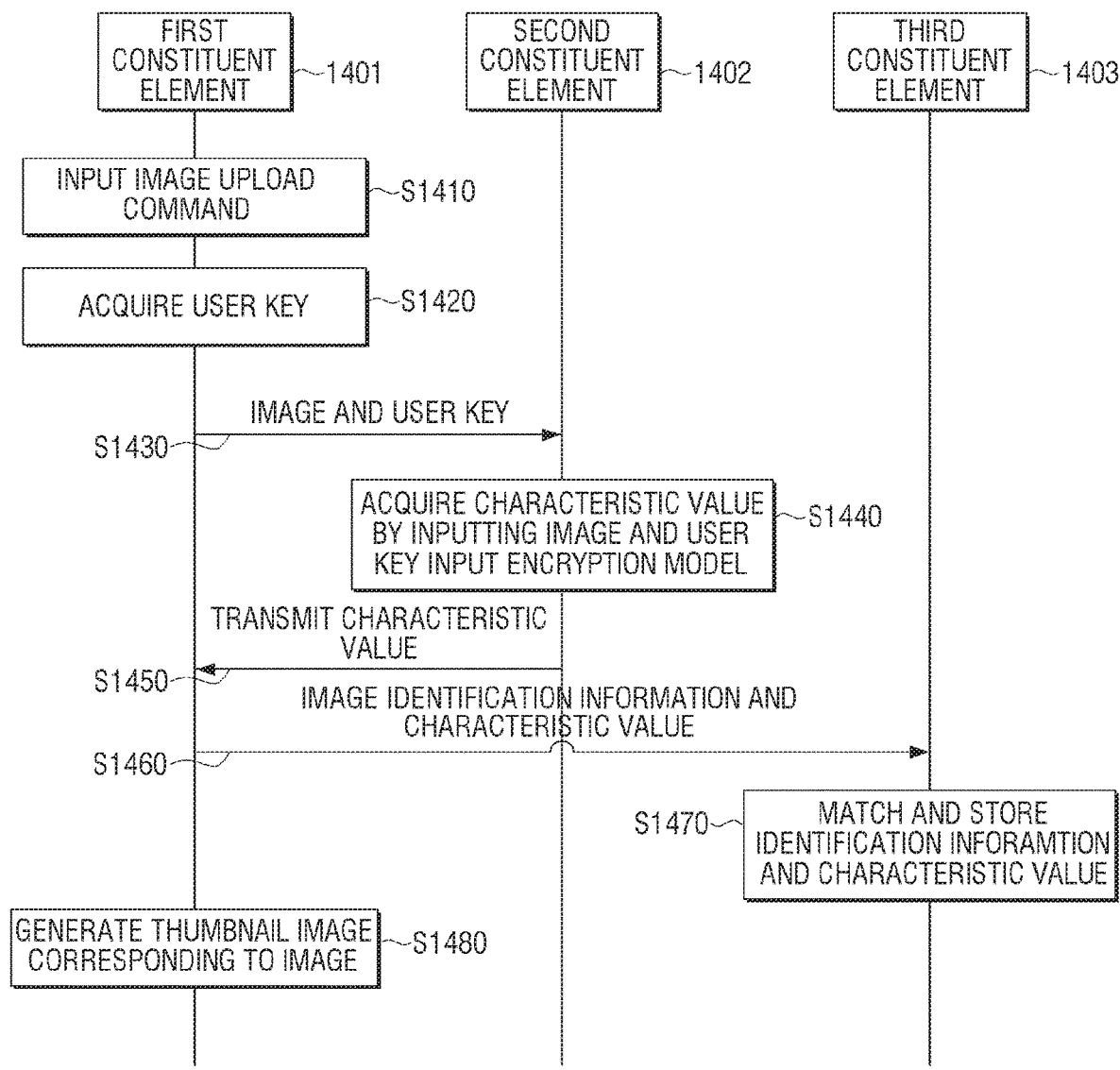
FIGS. 14 and 15 are flowcharts to explain a network system that uses an encryption model or a decryption model according to various embodiments.
Figure 15:
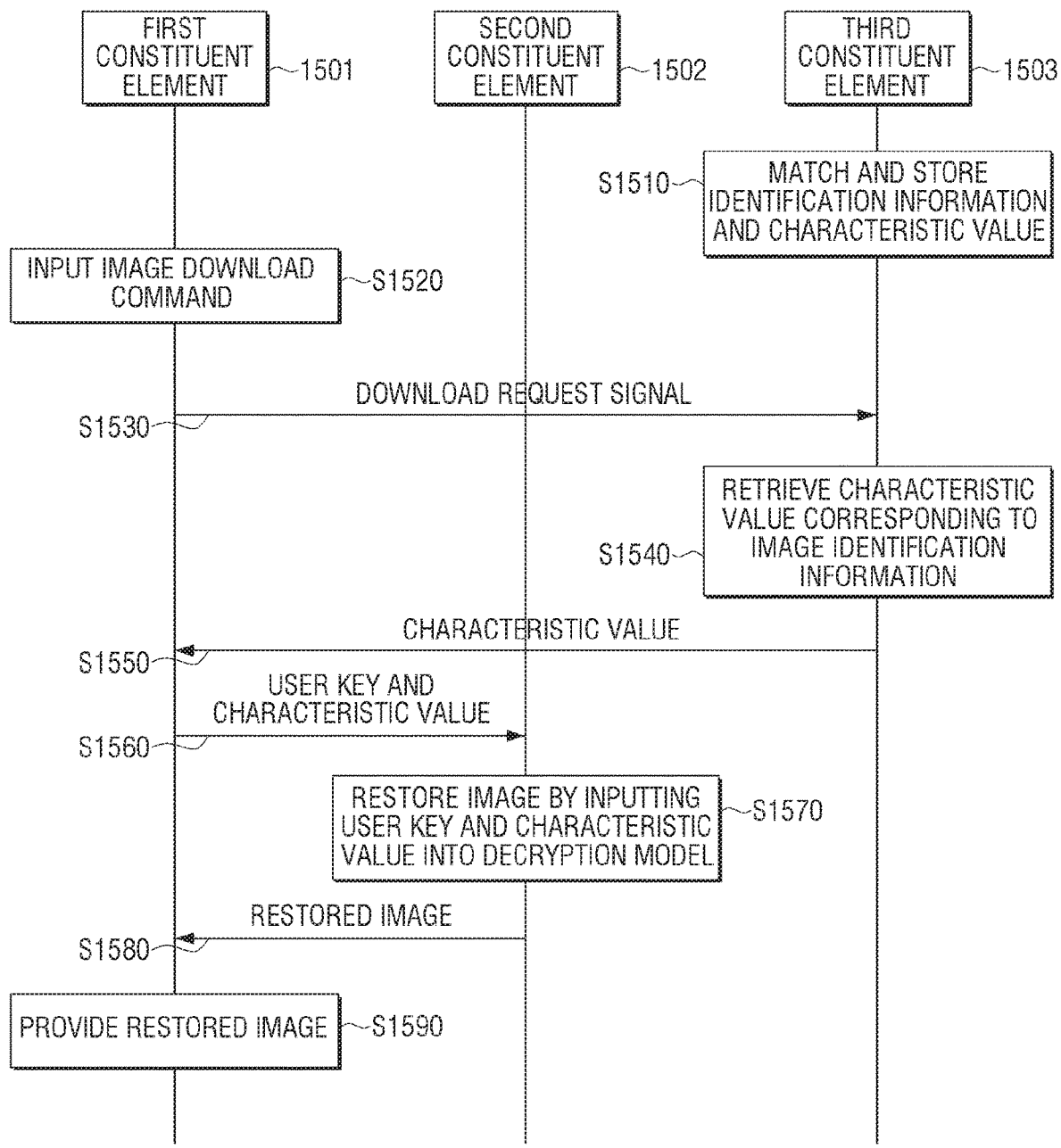

FIGS. 14 and 15 are flowcharts to explain a network system that uses an encryption model or a decryption model according to various embodiments. Referring to FIGS. 14 and 15, the network system using the encryption model or the decryption model may include first constituent elements 1401 and 1501 and second constituent elements 1402 and 1502.

The first constituent elements 1401 and 1501 may each be a device, such as the electronic device 100, and the second constituent elements 1402 and 1502 may each be a server, such as the server 200 that stores the encryption model or the decryption model. The first constituent elements 1401 and 1501 may include a general purpose processor, and the second constituent elements 1402 and 1502 may include an artificial intelligence dedicated processor, or the first constituent elements 1401 and 1501 may be at least one application, and the second constituent elements 1402 and 1502 may be an OS. The second constituent elements 1402 and 1502 may be more integrated, dedicated, less delayed, performance dominated, or may have the significant amount of resources than the first constituent elements 1401 and 1501, thereby more quickly and effectively processing calculations used for generating, updating, or applying an encryption model or a decryption model than the first constituent elements 1401 and 1501.

The interface for transmitting and receiving data between the first constituent elements 1401 and 1501 and the second constituent elements 1402 and 1502 may be defined.

For example, an application program interface (API) having training data to be applied to the encryption model or the decryption model as a factor value (or a parameter value or a transfer value) may be defined. The API may be defined by a sub-routine or a set of functions that could be called for a processing of one protocol (e.g., a protocol defined in the electronic device 100) in another protocol (e.g., a protocol defined in the server 200). In other words, it is possible to provide an environment where any one protocol performs an operation of another protocol through the API.

The third constituent elements 1403 and 1503 may each be embodied as an external server or a cloud device that matches and stores a characteristic value corresponding to the image and identification information of the image.

Referring to FIG. 14, the first constituent element 1401 may receive an image upload command at step S1410. The image upload command may be acquired through the menu with respect to the image, but the present disclosure is not limited thereto.

The first constituent element 1401 may acquire a user key at step S1420. The user key may be the identification information of the electronic device 100 or the password input by the user.

The first constituent element 1401 may transmit the image and the user key to the second constituent element 1402 at step S1430. When there are a plurality of user keys, the first constituent element 1401 may transmit the version information with respect to a user key corresponding to an image among the plurality of user keys.

The second constituent element 1402 may acquire a characteristic value by inputting an image and a user key to an encryption model at step S1440. The encryption model may be a model to be trained to acquire a characteristic value corresponding to an image by using an image and a user key as input data.

The second constituent element 1402 may transmit a characteristic value corresponding to an image to the first constituent element 1401 at step S1450.

The first constituent element 1401 may transmit identification information of an image and a characteristic value corresponding to an image to the third constituent element 1403 at step S1460. The first constituent element 1401 may transmit the version information on the user key to the third constituent element 1403.

The third constituent element 1403 may match and store the identification information of an image transmitted from the first constituent element 1401 and the characteristic value corresponding to the image at step S1470. The third constituent element 1403 may also store the version information on the user key.

The first constituent element 1401 may generate a thumbnail image corresponding to the image at step S1480. Based on a user command for displaying an image being received, the first constituent element 1401 may display the generated thumbnail image.

Referring to FIG. 15, a third constituent element 1503 may match and store identification information and a characteristic value at step S1510.

The first constituent element 1501 may receive a download command for an image at step S1520. The download command may be input through a menu with respect to the image, but the present disclosure is not limited thereto. The download command may be input in various manners.

The first constituent element 1501 may transmit a download request signal to the third constituent element 1503 at step S1530. The download request signal may include identification information of an image to be downloaded.

The third constituent element 1503 may retrieve a characteristic value corresponding to the identification information of the image at step S1540. A characteristic value matched with the identification information of the image among the plurality of characteristic values stored in the third constituent element 1503 may be retrieved.

The third constituent element 1503 may transmit the retrieved characteristic value to the first constituent element 1501 at step S1550. The third constituent element 1503 may transmit the retrieved characteristic value to the first constituent element 1501, but the present disclosure is not limited thereto. The retrieved characteristic value may be directly transmitted to the second constituent element 1502.

The first constituent element 1501 may transmit the user key and the characteristic value to the second constituent element 1502 at step S1560.

The second constituent element 1502 may store an image by inputting the user key and the characteristic value to the decryption model at step S1570. The decryption model may be a model that is trained to restore an image by using the user key and the characteristic value as input data and could be trained in parallel with the encryption model.

The second constituent element 1502 may transmit the restored image to the first constituent element 1501 at step S1580.

The first constituent element 1501 may provide the restored image at step S1590. The first constituent element 1501 may store the restored image.

Various embodiment may be embodied as software including commands stored in machine-readable storage media. The machine may be an apparatus that calls one or more instructions stored in a storage medium and is operable according to the called instructions, including an electronic device in accordance with the disclosed embodiments (e.g., an electronic device 100). When the one or more instructions are executed by a processor, the processor may perform the function corresponding to the instructions, either directly or under the control of the processor, using other components. The one or more instructions may include a code made by a compiler or a code executable by an interpreter. The machine-readable storage medium may be provided in the form of a non-transitory storage medium. The 'non-transitory' means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity.

A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

At least one of the components, elements, modules or units represented by a block, including those illustrated in FIGS. 2-4, 7, 12, 13A, 13B and 13C, may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Although embodiments have been shown and described, it will be appreciated by those skilled in the art that changes may be made to these embodiments without departing from the principles and spirit of the present disclosure. Accordingly, the scope of the present disclosure is not construed as being limited to the described embodiments, but is defined by the appended claims as well as equivalents thereto.

What is claimed is:

1. A method for controlling an electronic device including at least one processor configured to encrypt an image and upload the encrypted image to an external server by using an artificial intelligence neural network model, the method comprising:
   receiving a first command to upload a first image to the external server;
   acquiring, based on the first command, a first characteristic value corresponding to the first image by inputting the first image and a key of the electronic device into a neural network model trained to identify characteristic values based on an input image and an input key;
   transmitting identification information of the first image and the first characteristic value to the external server; and
   restoring, based on a second command to download the first image from the external server, the first image by inputting the first characteristic value corresponding to the first image and the key of the electronic device into a decryption model,
   wherein the key of the electronic device is one from among a password of the electronic device and identification information of the electronic device.

2. The method as claimed in claim 1, wherein the key is one of a plurality of keys, and
   wherein the transmitting comprises transmitting version information of the key corresponding to the first image to the external server together with the identification information of the first image and the first characteristic value.

3. The method as claimed in claim 1, further comprising:
   acquiring, based on the first command, a thumbnail image corresponding to the first image;
   matching and storing the thumbnail image and the identification information of the first image; and
   deleting the first image.

4. The method as claimed in claim 3, further comprising providing the thumbnail image based on receiving a display command to display the first image.

5. The method as claimed in claim 1, wherein the external server matches and stores the identification information of the first image and the first characteristic value, compares a similarity between the first image and another image based on the first characteristic value, and classifies the first image based on the similarity.

6. The method as claimed in claim 5, further comprising:
   receiving a retrieval command to retrieve a second image related to a keyword;
   transmitting a request to the external server requesting a search related to the keyword; and
   receiving, based on the request, a second characteristic value corresponding to at least one search image related to the keyword from the external server, the at least one search image being at least one from among images classified based on the similarity comparison.

7. The method as claimed in claim 6, further comprising restoring the at least one search image by inputting the second characteristic value corresponding to the at least one search image and the key of the electronic device into the decryption model trained to restore an image by using the second characteristic value corresponding to the at least one search image and the key as input data.

8. The method as claimed in claim 1, further comprising:
   transmitting, based on receiving a download command to receive the first characteristic value corresponding to the first image, a request signal requesting the first characteristic value corresponding to the first image to the external server; and
   receiving, based on the request signal, the first characteristic value corresponding to the first image from the external server.

9. The method as claimed in claim 8, wherein the receiving comprises receiving version information of the key of the electronic device used for encrypting the first image together with the first characteristic value corresponding to the first image from the external server, and
   wherein the restoring comprises restoring the first image by inputting the first characteristic value corresponding to the first image and the key of the electronic device corresponding to the version information into the decryption model.

10. An electronic device, comprising:
    a communicator;
    a display;
    a memory; and
    a processor configured to control the electronic device in electrical connection with the communicator, the display and the memory,
    wherein the processor is further configured to:
      implement a neural network model trained to acquire a characteristic value by using an image and a key as input data and a program for performing an operation of the electronic device,
      acquire an input signal according to a first command to upload a first image to an external server,
      acquire, based on the input signal, a first characteristic value corresponding to the first image by inputting the first image and the key of the electronic device into the neural network model,
      control the communicator to transmit identification information of the first image and the first characteristic value to the external server, and
      restore, based on a second command to download the first image from the external server, the first image by inputting the first characteristic value corresponding to the first image and the key of the electronic device into a decryption model, wherein the key of the electronic device is one from among a password of the electronic device and identification information of the electronic device.

11. The electronic device as claimed in claim 10, wherein the key is one of a plurality of keys, and
wherein the processor is further configured to control the communicator to transmit version information of the key corresponding to the first image to the external server together with the identification information of the first image and the first characteristic value.

12. The electronic device as claimed in claim 10, wherein the processor is further configured to:
acquire, based on the first command, a thumbnail image corresponding to the first image,
match and store the thumbnail image and the identification information of the first image in the memory, and
delete the first image from the memory.

13. The electronic device as claimed in claim 12, wherein the processor is further configured to control the display to provide the thumbnail image based on receiving a display command to display the first image.

14. The electronic device as claimed in claim 10, wherein the identification information of the first image is matched with the first characteristic value in the external server, and
wherein the external server compares a similarity between the first image and another image based on the first characteristic value, and classifies the first image based on the similarity.

15. The electronic device as claimed in claim 14, wherein the processor is further configured to:
acquire an input signal according to a retrieval command to retrieve at least one image related to an input keyword,
control the communicator to transmit a request signal to the external server requesting a search related to the keyword to the external server, and
receive a second characteristic value corresponding to at least one search image related to the keyword from the external server through the communicator, the at least one search image being at least one from among images classified based on the similarity comparison.

16. The electronic device as claimed in claim 15, wherein the processor is further configured to:
implement the decryption model trained to restore an image by using a characteristic value and a key as input data, and
restore the at least one search image by inputting the second characteristic value corresponding to the at least one search image and the key of the electronic device into the decryption model.

17. The electronic device as claimed in claim 10, wherein the processor is further configured to:
implement the decryption model trained to restore an image by using a characteristic value and a key as input data,
control the communicator to transmit, based on a download command to receive the first characteristic value corresponding to the first image being received, a request signal requesting the first characteristic value corresponding to the first image to the external server,
receive the first characteristic value corresponding to the first image from the external server through the communicator.

18. The electronic device as claimed in claim 17, wherein version information of the key of the electronic device used for encrypting the first image is received together with the first characteristic value corresponding to the first image from the external server, and
wherein the processor is further configured to restore the first image by inputting the first characteristic value corresponding to the first image and the key of the electronic device corresponding to the version information into the decryption model.

19. A non-transitory computer readable recording medium having embodied thereon a program, which when executed by a processor of an electronic device including at least one processor to encrypt an image and upload the encrypted image to an external server by using an artificial intelligence neural network model, causes the processor to execute a method for controlling the electronic device, the method including:
receiving a first command to upload a first image to the external server;
acquiring, based on the first command, a first characteristic value corresponding to the first image by inputting the first image and a key of the electronic device into a neural network model trained to identify characteristic values based on an input image and an input key;
transmitting identification information of the first image and the first characteristic value to the external server; and
restoring, based on a second command to download the first image from the external server, the image by inputting the first characteristic value corresponding to the first image and the key of the electronic device into a decryption model,
wherein the key of the electronic device is one from among a password of the electronic device and identification information of the electronic device.

* * * * *